US006271883B1

(12) United States Patent
Iijima et al.

(10) Patent No.: US 6,271,883 B1
(45) Date of Patent: *Aug. 7, 2001

(54) AUTOMATIC FOCUSING APPARATUS FOR A VIDEO CAMERA

(75) Inventors: Ryunosuke Iijima, Ebina; Hirofumi Suda, Yokohama; Kunihiko Yamada, Tanashi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,809

(22) Filed: Nov. 20, 1997

Related U.S. Application Data

(63) Continuation of application No. 08/539,427, filed on Oct. 5, 1995, now abandoned, which is a continuation of application No. 08/172,576, filed on Dec. 22, 1993, now abandoned.

(30) Foreign Application Priority Data

Dec. 28, 1992 (JP) .................................................. 4-361620
Mar. 12, 1993 (JP) .................................................. 5-078857

(51) Int. Cl.$^7$ ............................ G03B 13/00; H04N 5/232
(52) U.S. Cl. ........................ 348/345; 348/347; 348/349; 348/354; 396/121
(58) Field of Search .................................. 348/345, 348, 348/349, 350, 351, 353, 354, 355, 356; 396/121

(56) References Cited

U.S. PATENT DOCUMENTS 4,967,280 * 10/1990 Takuma et al. ...................... 358/355
5,003,339 * 3/1991 Kikuchi et al. ...................... 354/402
5,027,148 * 6/1991 Anagnostopoulos ................. 348/243
5,093,716 * 3/1992 Kondo et al. ......................... 358/224
5,534,923    7/1996 Suda ..................................... 348/354
5,585,844   12/1996 Hieda et al. .......................... 348/224

FOREIGN PATENT DOCUMENTS 4113537   11/1991 (DE) ................................. G02B/7/38
0443818    8/1991 (EP) ............................... H04N/5/232
0573986   12/1993 (EP) ............................... H04N/5/232

OTHER PUBLICATIONS

U.S. application No. 08/676,871, filed Jul. 3, 1996.
U.S. application No. 08/676,871, filed Jul. 3, 1996.

* cited by examiner

Primary Examiner—Matthew C. Bella
(74) Attorney, Agent, or Firm—Morgan & Finnegan, L.L.P.

(57) ABSTRACT

There is disclosed an integrated circuit for focus control, which is obtained by integrating, on a single chip, a filter circuit for extracting a predetermined signal component, which changes in accordance with a focusing state, from an image pickup signal, a gate circuit for extracting a focus signal, corresponding to a portion in a focus detection region in a photographing frame, from a focus signal extracted by the filter circuit, an arithmetic circuit for generating an evaluation signal of the focusing state by performing predetermined signal processing for the focus signal extracted by the gate circuit and corresponding to the portion in the focus detection region, a region setting circuit for controlling the positions or the number of focus detection regions in the photographing field by controlling the gate circuit, and an interface for connecting the respective circuits to an external circuit, and allowing the circuits to be controlled by a command from the control circuit.

48 Claims, 13 Drawing Sheets

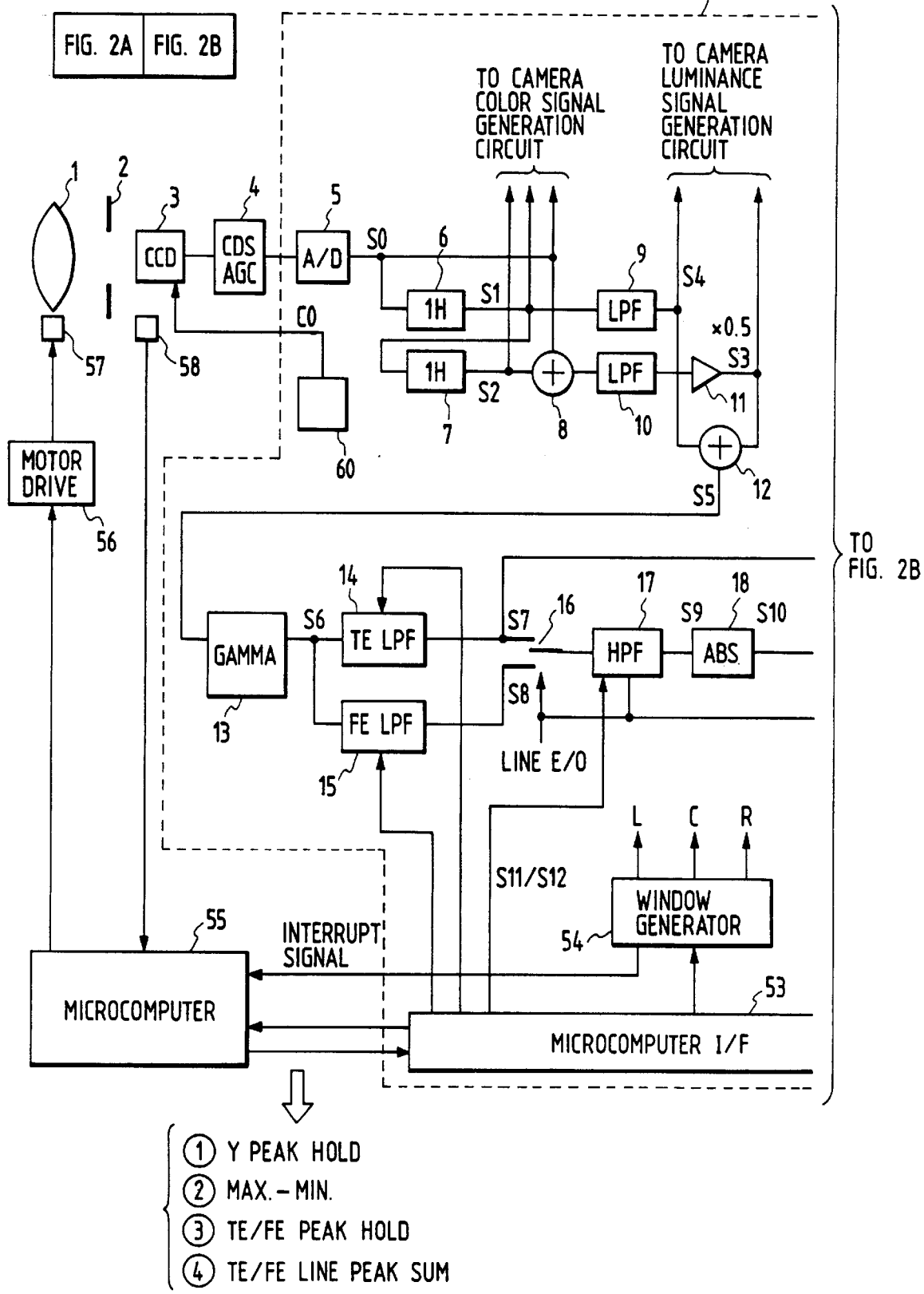

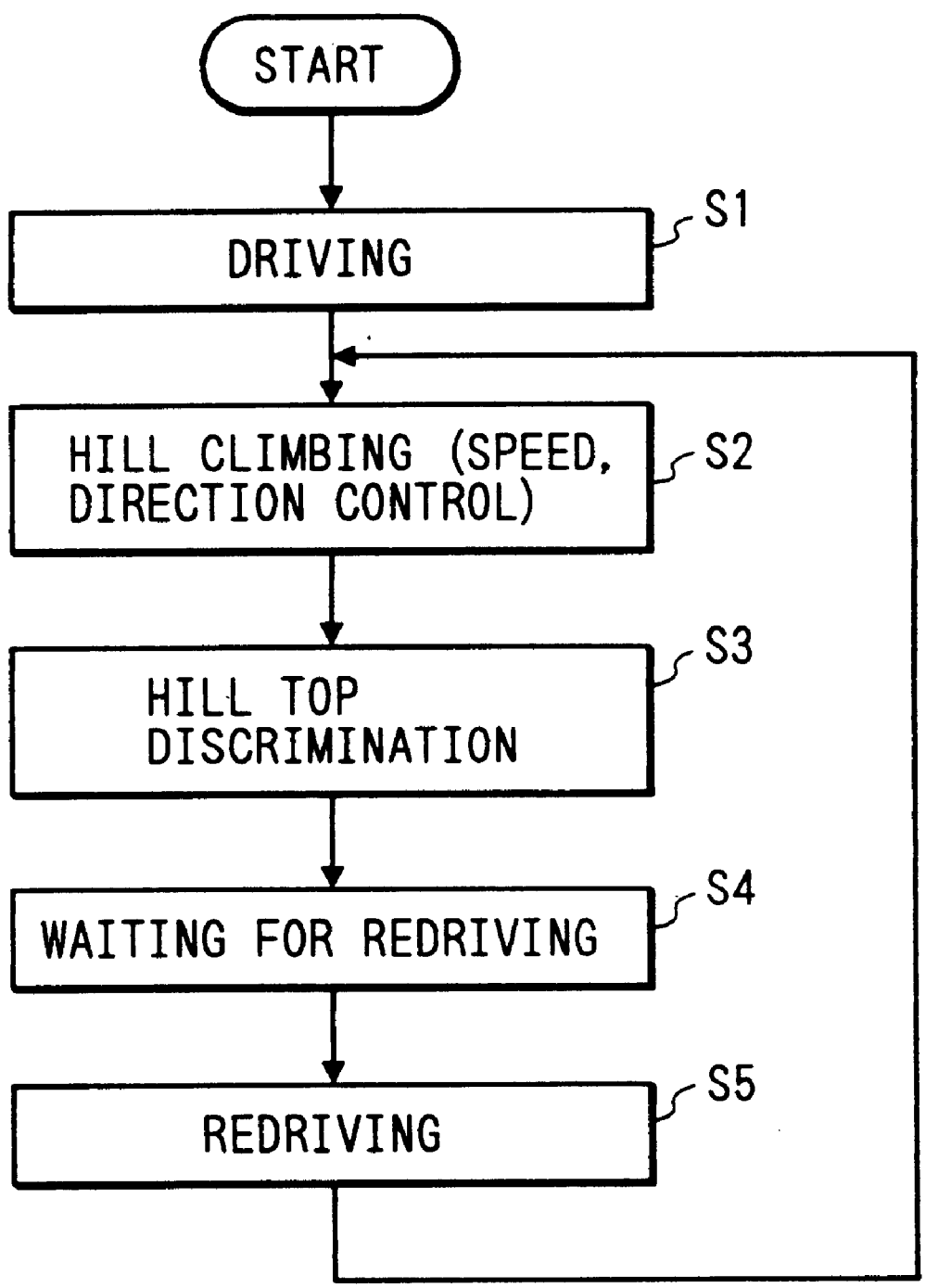

//AUTOMATIC FOCUSING APPARATUS FOR A VIDEO CAMERA

This is a Continuation of Ser. No. 08/539,427, filed on Oct. 5, 1995, now abandoned which is a continuation of application Ser. No. 08/172,576, filed on Dec. 22, 1993 now abandoned.

BACKGROUND OF THE INVENTION

1. Field of the Invention

The present invention relates to an automatic focusing apparatus which is suitably used in video equipment comprising image pickup means such as a video camera, and performs automatic focusing control using an image pickup signal output from the image pickup means.

2. Related Background Art

Video equipment comprising image pickup means such as a video camera adopts an automatic focusing (AF) system wherein a predetermined signal component, which changes in correspondence with a focusing state, is extracted from an image pickup signal output from the image pickup means, and the extracted signal component is used as an evaluation signal of the focusing state.

For example, an AF apparatus based on a so-called "hill-climbing AF system" is known. In the hill-climbing AF system, a high-frequency component indicating sharpness of an image is extracted from an image pickup signal output from an image pickup element such as a CCD, and a focusing lens is driven to maximize the level of the extracted high-frequency component, thus achieving AF control.

FIG. 1 shows the arrangement of a conventional AF apparatus based on the "hill-climbing system".

Referring to FIG. 1, a focusing lens 1 is moved by a lens driving motor 57 in the optical axis direction to achieve a focusing operation. Light transmitted through the focusing lens 1 forms an image on the image pickup surface of an image pickup element 3, the formed image is photoelectrically converted into an electrical image pickup signal, and the image pickup signal is output. The image pickup signal is sampled and held by a CDS (double correlation sampling circuit)/AGC (auto-gain control circuit) 4, and is amplified to a predetermined level. Thereafter, the image pickup signal is converted into a digital image pickup signal by an A/D converter 5. The digital image pickup signal is input to a process circuit of a camera, and is converted into a standard television signal based on the NTSC system. The digital image pickup signal is also input to a band-pass filter (to be referred to as a BPF hereinafter) 100.

The BPF 100 extracts a high-frequency component from the image pickup signal, and a gate circuit 101 extracts only a signal corresponding to a portion set to be an in-focus detection region in a photographing field. A peak hold circuit 102 holds a peak value of the output from the gate circuit 101 at an interval synchronous with an integer multiple of a vertical synchronization signal. Since this peak hold value is utilized in AF control, it will be referred to as an AF evaluation value hereinafter.

A speed discrimination circuit 104 sets a focusing speed corresponding to an in-focus degree on the basis of the AP evaluation value. More specifically, the circuit 104 instructs a motor driver 56 to vary the motor speed, so that the motor speed is increased in a considerably out-of-focus state, and the motor speed is decreased in a slightly out-of-focus state. On the other hand, a direction discrimination circuit 103 sets the motor driving direction in a direction to increase the AF evaluation value, thereby increasing the in-focus degree. Such control is the above-mentioned hill-climbing control.

In the conventional AF apparatus based on the hill-climbing system, since AF control is performed using only a focus detection signal extracted from only one focus detection region set in the photographing field, the AF operation becomes unstable depending on objects and photographing conditions.

In order to realize the above-mentioned AF apparatus using the image pickup signal, many means such as means for extracting an evaluation signal, which changes in correspondence with a focusing state, from an image pickup signal, means for setting a detection region in a photographing field for obtaining the evaluation signal, arithmetic & control means for executing a control algorithm for driving a focusing lens on the basis of the evaluation signal, means for controlling the operation timing with other circuits other than those associated with an AF function, and the like are required. For this reason, the circuit arrangement, and various setting and adjustment operations as a whole are complicated. Also, use of both analog and digital circuits disturbs efficient signal processing, and undesirably allows easy mixing of noise. Thus, the AF apparatus suffers from many problems including the above-mentioned problems, and it is difficult to realize a stable, efficient, and high-precision AF apparatus.

In particular, in a focus detection apparatus using an image pickup signal, since a dynamic image is to be picked up, a detection region corresponding to a change in image must be set, and a focus detection algorithm corresponding to a change in image must be executed. However, it is very difficult to realize these operations by the above-mentioned circuit arrangement. Therefore, demand has arisen for practical means which can efficiently and stably control circuit operations, can simplify the circuit arrangement, and allows easy connections with other control circuits to improve efficiency of the entire system.

SUMMARY OF THE INVENTION

The present invention has been made to solve the above-mentioned problems, and has as its first object to realize high efficiency, simplification, and high reliability of control of various functions necessary for realizing an AF function.

It is the second object of the present invention to improve efficiency and versatility of processing by forming a one-chip IC including circuits for realizing various functions for executing the AF function.

In order to solve the above-mentioned problems, according to one preferred aspect of the present invention, there is disclosed a focus signal control integrated circuit comprising at least: gate means for extracting only an image pickup signal corresponding to a portion inside a predetermined detection region in a photographing field, and capable of changing a setting position of the detection region in the photographing field; filter means for extracting a predetermined frequency component, which changes in correspondence with a focusing state, from the image pickup signal extracted by the gate means; arithmetic means for generating an evaluation signal of the focusing state by executing predetermined processing of the predetermined signal component extracted by the filter means; region setting means for controlling the position or the number of focus detection regions in the photographing field by controlling the gate means; and interface means for allowing external control of the respective means.

Thus, various functions necessary for AF control can be integrated on a one-chip IC, the position or the number of focus detection regions in the photographing field can be freely set by an external control command, the operations of various functions can be controlled in correspondence with a photographing state, and timing control with other functions is facilitated. Therefore, a one-chip IC for an AP apparatus, which can satisfy various requirements from the system design, can be realized.

It is the third object of the present invention to disclose an automatic focus detection apparatus which can solve a conventional problem that focus detection precision deteriorates due to a change in object image and photographing conditions to cause an erroneous operation in an apparatus for performing focus detection on the basis of an image pickup signal in a single fixed focus detection region set in a photographing field, and allows a stable AF operation all the time despite a change in object image and photographing conditions without causing any erroneous operation.

In order to achieve the above object, according to another preferred aspect of the present invention, there is disclosed an automatic focus detection apparatus comprising: filter means for extracting a predetermined frequency component from an image pickup signal output from image pickup means; gate means for allowing only a signal corresponding to a portion in a focus detection region in a photographing field to pass therethrough with respect to the output from the filter means; detection means for detecting a luminance signal component from the image pickup signal in the focus detection region; correction means for correcting a focus signal extracted by the gate means by the output from the detection means; and driving means for driving a focusing lens of an optical system to an in-focus point on the basis of the output signal from the correction means.

In order to achieve the above object, according to still another preferred aspect of the present invention, there is disclosed an automatic focus detection apparatus comprising: filter means for extracting a predetermined frequency component from an image pickup signal output from image pickup means; gate means for movably setting a plurality of focus detection regions in a photographing field with respect to the output from the filter means, and allowing signals corresponding to portions in the focus detection regions to pass therethrough; detection means for detecting luminance signal components from the image pickup signals in the respective focus detection regions; correction means for correcting focus signals extracted by the gate means by the outputs from the detection means; and driving means for driving a focusing lens of an optical system to an in-focus point on the basis of the output signals from the correction means.

It is the fourth object of the present invention to improve the performance of a conventional "hill-climbing AF system," and to provide an automatic focus detection apparatus which can fetch an evaluation signal of a focusing state at a shorter period, can shorten a time lag between the current image signal and AF control, and can realize high-precision, high-speed, and stable AF control.

In order to achieve the above object, according to still another preferred aspect of the present invention, there is disclosed an automatic focus detection apparatus comprising: a plurality of band-pass filters each for extracting a predetermined focus signal, which changes in correspondence with a focusing state, from an image pickup signal output from image pickup means; switching means for switching the band-pass filters; horizontal direction detection means for detecting an output level of the band-pass filter in synchronism with a horizontal synchronization signal; and peak hold means for holding a peak value of an output from the horizontal direction detection means.

It is the fifth object of the present invention to provide an AF apparatus which can prevent an out-of-focus image from being recorded, by redriving an AF operation when a recording standby state transits to a recording state.

It is the sixth object of the present invention to provide an AF apparatus which can attain a quick focusing operation by driving a focusing lens in a direction determined based on the position of the focusing lens and a predetermined standard object position when the driving direction of the focusing lens cannot be discriminated on the basis of the focus signal level.

Other objects and arrangements of the present invention will become apparent from the following description of the specification taken in conjunction with the accompanying drawings.

BRIEF DESCRIPTION OF THE DRAWINGS

FIGS. 2A and 2B, when combined together as shown in FIG. 2, show a block diagram showing an arrangement of an AF apparatus according to the present invention;

FIGS. 8A and 8B are respectively a flow chart showing an AF operation, and an operation explanatory view;

DETAILED DESCRIPTION OF THE PREFERRED EMBODIMENTS

The arrangement and operation of an AF apparatus according to the present invention will be described below with reference to the accompanying drawings.

FIG. 2 is a block diagram showing the first embodiment of an AF apparatus according to the present invention, and disclosing an AF IC according to the present invention at the same time.

Figure 1:
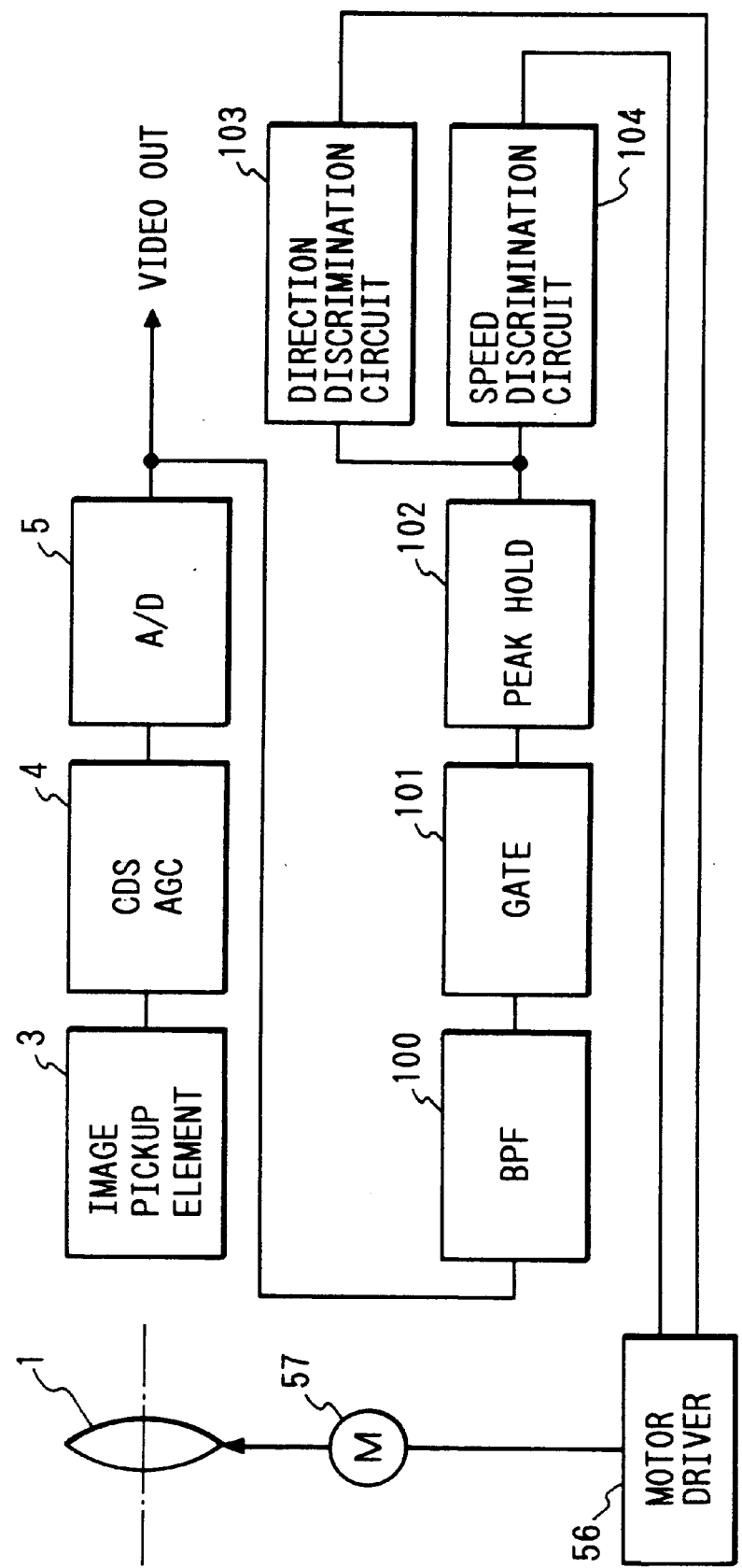
FIG. 1 is a block diagram showing an arrangement of a conventional AF apparatus.

The apparatus shown in FIG. 1 includes an AF integrated circuit (IC) AFP.

A focusing lens 1 is moved by a lens driving motor 57 in the optical axis direction, thus achieving a focusing operation.

The incident light amount of an optical image transmitted through the focus lens is stopped by an iris 2, and the passed optical image is formed on the image pickup surface of an image pickup element 3. The optical image is photoelectrically converted into an electrical image pickup signal, and the image pickup signal is output.

The image pickup element 3 is driven by a reference clock C0 output from a reference clock generator 60. A charge accumulated on the image pickup element is read out in synchronism with the reference clock, and is output as an image pickup signal.

The image pickup signal output from the image pickup element 3 is sampled and held by a CDS (double correlation sampling circuit)/AGC (auto-gain control) circuit 4, and at the same time, is amplified by the AGC to a predetermined level at an optimal gain. The amplified signal is supplied to the AF IC AFP.

The image pickup signal supplied to the AF IC AFP is converted into a digital signal S0 synchronized with the reference clock signal C0 by an A/D converter 5. Subsequently, digital signal processing is executed.

A one-horizontal period delay element (to be referred to as a 1H delay element hereinafter) 6 forms a signal S1 by delaying the digital signal S0 by one horizontal period, and a 1H delay element 7 forms a signal S2 by delaying the output from the 1H delay element 6 by another horizontal period.

These signals S0, S1, and S2 are input to a color signal generation circuit (not shown) of a camera. At the same time, the signals S0 and S2 are added to each other by an adder 8. Color signal components are removed from the sum signal by a low-pass filter (to be referred to as an LPF hereinafter) 10 to extract only a luminance signal component. A coefficient multiplier 11 multiplies the luminance signal component with a predetermined coefficient (0.5) to generate a signal S3. Also, from the signal S0, a signal S4 obtained by extracting only a luminance signal by an LPF 9 is generated. These signals S3 and S4 are input to a luminance signal generation circuit of the camera, and at the same time, they are added to each other by an adder 12 to generate an AF signal S5. More specifically, by the 1H delay elements 6 and 7, the adder 12, the coefficient multiplier 11, and the LPFs 9 and 10, a luminance signal and a color signal are separated from an image pickup signal and are supplied to the corresponding processing circuits, and an AF signal for extracting a focus signal is generated.

Figure 7:
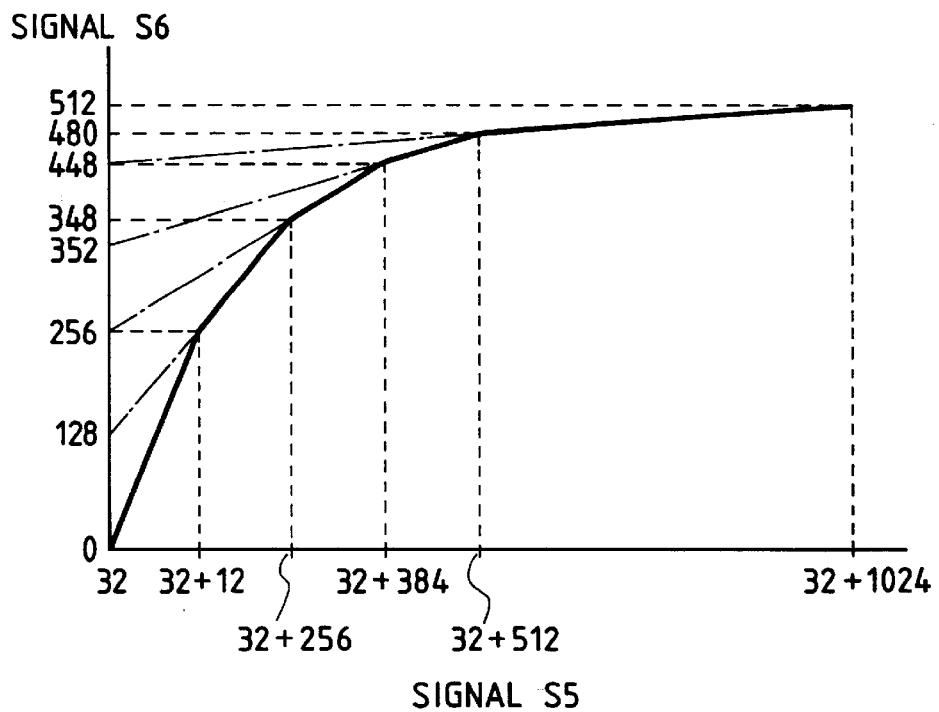
FIG. 7 is a graph showing the input/output characteristics of a gamma circuit shown in FIGS. 2A and 2B.

The AF signal S5 is input to a gamma circuit 13, and is gamma-converted on the basis of a polygonal gamma curve representing characteristics shown in FIG. 7. More specifically, by emphasizing a low-luminance component, and suppressing a high-luminance component, a signal S6, which is gamma-converted to control input light of the camera to be proportional to the light emission intensity of a cathode-ray tube, is generated. The gamma-converted signal S6 is input to a TE-LPF 14 as an LPF having a high cutoff frequency, and an FE-LPF 15 as an LPF having a low cutoff frequency, and predetermined frequency components are extracted by these LPFs. The filter characteristic values of the TE-LPF 14 and the FE-LPF 15 are determined by and supplied from a system control microcomputer (to be referred to as a microcomputer hereinafter) 55 via a microcomputer interface 53. Then, low-frequency components are extracted according to the corresponding filter characteristic values, thus generating an output signal S7 of the TE-LPF 14 and an output signal S8 of the FE-LPF 15.

A switch 16 is switched in response to a signal Line E/O for identifying whether a horizontal scanning line is an even or odd line, and selectively inputs the signals S7 and S8 to a high-pass filter (to be referred to as an HPF hereinafter) 17. More specifically, when the signal Line E/O indicates an even line, the switch 16 supplies the signal S7 to the HPF 17; when the signal indicates an odd line, the switch 16 supplies the signal S8 to the HPF 17.

The HPF 17 generates a signal S9 by extracting only a predetermined high-frequency component from the signal S7 or S8 on the basis of filter characteristic values S11 and S12 for odd and even lines, which values are determined by the microcomputer 55 via the microcomputer interface 53. The signal S9 is converted into an absolute value by an absolute value circuit 18, thus generating a positive signal S10. The positive signal S10 is input to peak hold circuits 25, 26, and 27, and a line peak hold circuit 31 for detecting a peak value for each horizontal line.

A frame (or window) generator 54 sets frames such as focus detection regions on a photographing field.

Figure 6:
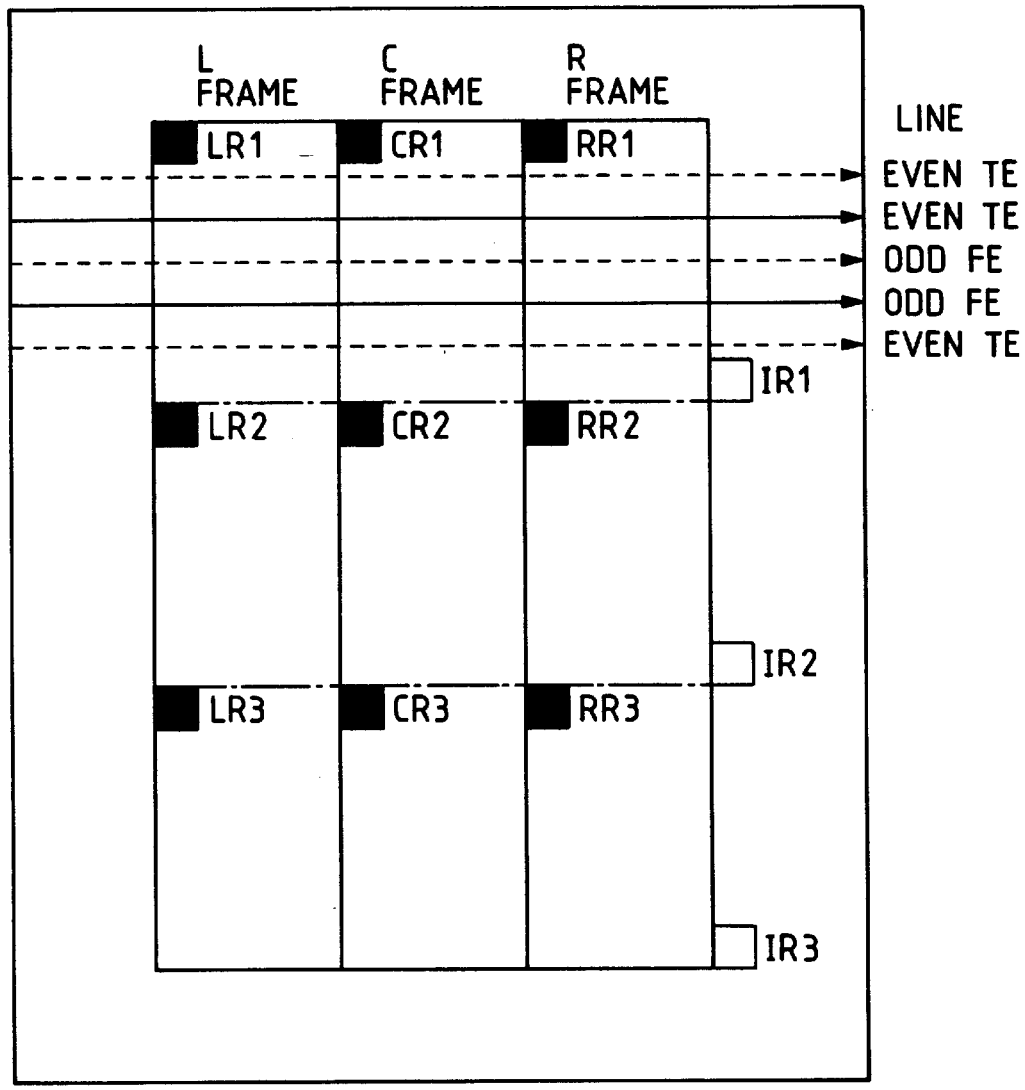
FIG. 6 is a view showing a method of forming a plurality of focusing gate frames (focus detection regions)

The frame generator 54 generates gate signals for setting focusing frames, i.e., L, C, and R frames, at positions in the photographing field, as shown in FIG. 6. FIG. 6 is an explanatory view for explaining the setting positions of the focusing frames in the photographing field. As can be seen from FIG. 6, nine rectangular frames are set in the photographing field. The number, sizes, and positions of the frames can be properly changed in correspondence with a design. Therefore, even and odd horizontal scanning lines are moved from the left to the right and from the upper position to the lower position of the photographing field, thereby detecting information in these frames. The peak hold circuit 25 receives the L frame forming gate signal output from the frame generator 54, and the signal Line E/O for identifying whether the horizontal line is an even or odd line. At each of upper left positions LR1, LR2, and LR3 each corresponding to the start position of the focusing L frame shown in FIG. 6, the L frame peak hold circuit 25 is initialized, i.e., its content is reset, and the circuit 25 holds a peak value of the signal S10 corresponding to either one of the even and odd lines, which is designated by the microcomputer 55 via the microcomputer interface 53, in each frame, and transfers the peak hold value in each frame to a buffer 28 at each of positions IR1, IR2, and IR3 in FIG. 6, thus generating a TE/FE peak evaluation value.

Similarly, the C frame peak hold circuit 26 receives the C frame forming gate signal output from the frame generator 54, and the signal Line E/O. At each of upper left positions CR1, CR2, and CR3 each corresponding to the start position of the focusing C frame shown in FIG. 6, the peak hold circuit 26 is initialized, i.e., its content is reset, and the circuit 26 holds a peak value of the signal S10 corresponding to either one of the even and odd lines, which is designated by the microcomputer 55 via the microcomputer interface 53, in each frame, and transfers the peak hold value in each frame to a buffer 29 at each of the positions IR1, IR2, and IR3, thus generating a TE/FE peak evaluation value.

Furthermore, similarly, the R frame peak hold circuit 27 receives the R frame forming gate signal output from the frame generator 54, and the signal Line E/O. At each of upper left positions RR1, RR2, and RR3 each corresponding to the start position of the focusing R frame shown in FIG.

6, the peak hold circuit 27 is initialized (reset), holds a peak value of the signal S10 corresponding to either one of the even and odd lines, which is designated by the microcomputer 55 via the microcomputer interface 53, in each frame, and transfers the peak hold value in each frame to a buffer 30 at each of the positions IR1, IR2, and IR3, thus generating a TE/FE peak evaluation value.

The line peak hold circuit 31 receives the signal S10, and the L, C, and R frame setting gate signals output from the frame generator 54, is initialized, i.e., reset at the horizontal start point in each frame, and holds a peak value, in one line, of the signal S10 in each frame. Integration circuits 32, 33, 34, 35, 36, and 37 receive the output from the line peak hold circuit 31, and the signal Line E/O for identifying whether the horizontal line is an even or odd line. At the same time, the integration circuits 32 and 35 receive the L frame signal output from the frame generator 54 and corresponding to the left side of the photographing field, the integration circuits 33 and 36 receive the C frame signal output from the frame generator 54 and corresponding to the central portion of the photographing field, and the integration circuits 34 and 37 receive the R frame signal output from the frame generator 54 and corresponding to the right side of the photographing field.

The integration circuit 32 is initialized (i.e., reset) at each of the upper left positions LR1, LR2, and LR3 each corresponding to the start position of the focusing L frame, adds the output from the line peak hold circuit 31 to the content of its internal register immediately before the end of each even line in each frame, and transfers a peak hold value to a buffer 38 at each of the positions IR1, IR2, and IR3, thus generating a line peak integration evaluation value.

The integration circuit 33 is initialized (i.e., reset) at each of the upper left positions CR1, CR2, and CR3 each corresponding to the start position of the focusing C frame, adds the output from the line peak hold circuit 31 to the content of its internal register immediately before the end of each even line in each frame, and transfers a peak hold value to a buffer 39 at each of the positions IR1, IR2, and IR3, thus generating a line peak integration evaluation value.

The integration circuit 34 is initialized (i.e., reset) at each of the upper left positions RR1, RR2, and RR3 each corresponding to the start position of the focusing R frame, adds the output from the line peak hold circuit 31 to the content of its internal register immediately before the end of each even line in each frame, and transfers a peak hold value to a buffer 40 at each of the positions IR1, IR2, and IR3, thus generating a line peak integration evaluation value.

The integration circuits 35, 36, and 37 add data of odd lines in place of addition of data of even lines in the integration circuits 32, 33, and 34, and transfer the sums to buffers 41, 42, and 43, respectively.

The signal S7 is input to peak hold circuits 19, 20, and 21, a line maximum value hold circuit 44, and a line minimum value hold circuit 45. The peak hold circuit 19 receives the L frame forming gate signal from the frame generator 54, is initialized at each of the upper left positions LR1, LR2, and LR3 each corresponding to the start position of the L frame, holds a peak value of the signal S7 in each frame, and transfers the peak hold value at each of the positions IR1, IR2, and IR3 to a buffer 22, thus generating a luminance Y peak evaluation value.

Similarly, the peak hold circuit 20 receives the C frame forming gate signal from the frame generator 54, is initialized at each of the upper left positions CR1, CR2, and CR3 each corresponding to the start position of the C frame, holds a peak value of the signal S7 in each frame, and transfers the peak hold value at each of the positions IR1, IR2, and IR3 to a buffer 23, thus generating a Y peak evaluation value.

Furthermore, similarly, the peak hold circuit 21 receives the R frame forming gate signal from the frame generator 54, is initialized at each of the upper left positions RR1, RR2, and RR3 each corresponding to the start position of the R frame, holds a peak value of the signal S7 in each frame, and transfers the peak hold value at each of the positions IR1, IR2, and IR3 to a buffer 24, thus generating a Y peak evaluation value. The line maximum value hold circuit 44 and the line minimum value hold circuit 45 receive the L, C, and R frame forming gate signals from the frame generator 54, are initialized at the horizontal start point in each frame, and respectively hold the maximum and minimum values in one line of the signal S7 in each frame.

The held maximum and minimum values are input to a subtracter 46, and a subtraction (maximum value Max−minimum value Min) is performed to generate a signal S13. The signal S13 is input to peak hold circuits 47, 48, and 49. The peak hold circuit 47 receives the L frame forming gate signal from the frame generator 54, is initialized at each of the upper left positions LR1, LR2, and LR3 each corresponding to the start position of the L frame, holds a peak value of the signal S10 in each frame, and transfers the peak hold result to a buffer 50 at each of the positions IR1, IR2, and IR3, thus generating a Max-Min evaluation value.

Similarly, the peak hold circuit 48 receives the C frame forming gate signal from the frame generator 54, is initialized at each of the upper left positions CR1, CR2, and CR3 each corresponding to the start position of the C frame, holds a peak value of the signal S10 in each frame, and transfers the peak hold result to a buffer 51 at each of the positions IR1, IR2, and IR3, thus generating a Max-Min evaluation value.

Similarly, the peak hold circuit 49 receives the R frame forming gate signal from the frame generator 54, is initialized at each of the upper left positions RR1, RR2, and RR3 each corresponding to the start position of the R frame, holds a peak value of the signal S10 in each frame, and transfers the peak hold result to a buffer 52 at each of the positions IR1, IR2, and IR3, thus generating a Max-Min evaluation value.

At each of the positions IR1, IR2, and IR3, data are transferred to the buffers 22, 23, 24, 28, 29, 30, 38, 39, 40, 41, 42, 43, 50, 51, and 52, and at the same time, the frame generator 54 supplies an interrupt signal to the microcomputer 55. Upon reception of this interrupt signal, the microcomputer 55 reads the signal in the buffers 22, 23, 24, 28, 29, 30, 38, 39, 40, 41, 42, 43, 50, 51, and 52 before the above-mentioned processing for the frame before the current frame is completed, and the next peak hold results are transferred to these buffers.

The microcomputer 55 drives the motor 57 via the motor driver 56 on the basis of the read signals, and the output signal from an iris encoder 58 to move the focusing lens 1 in the optical axis direction, thus executing in-focus control.

Figure 2B:
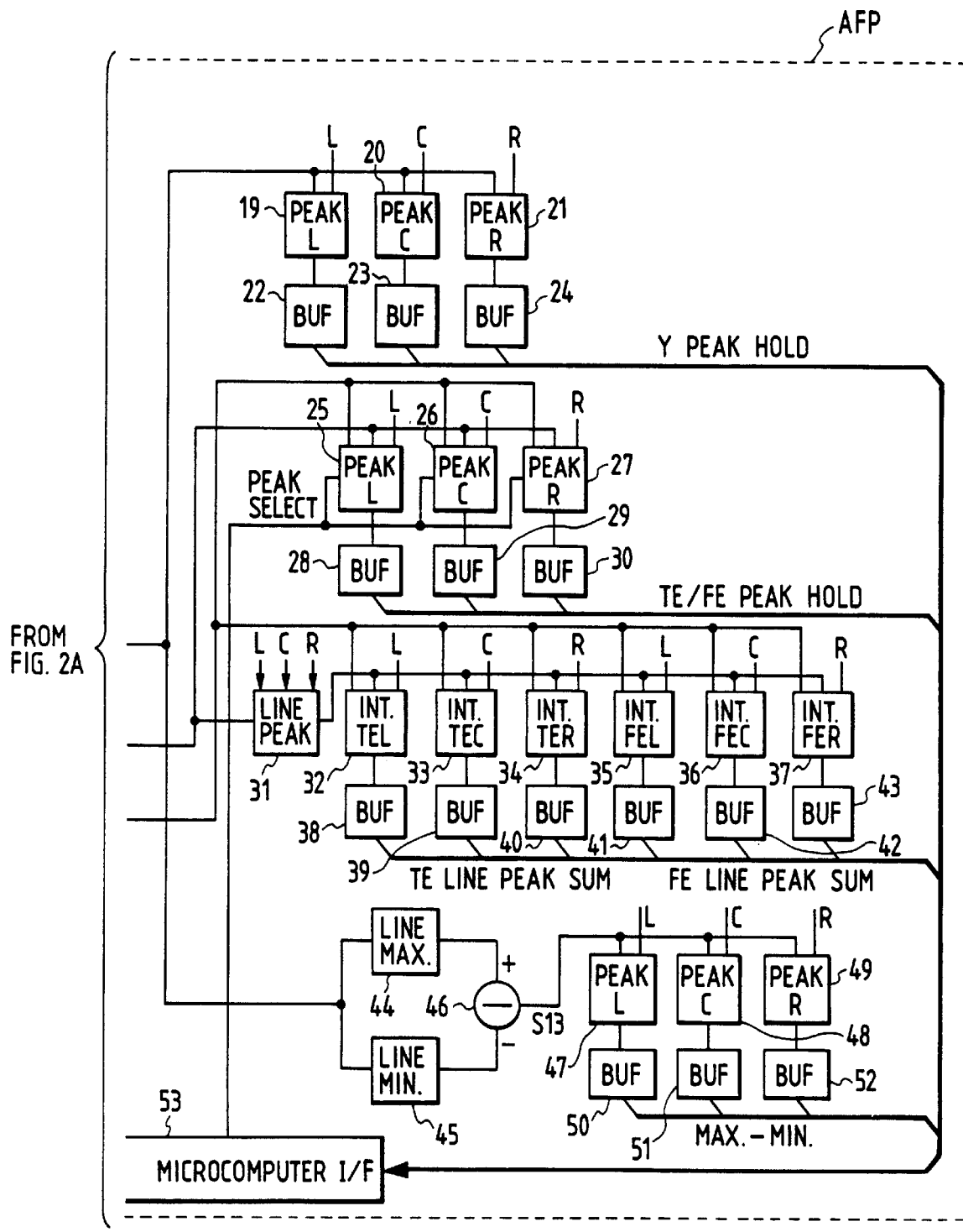

Referring to FIGS. 2A and 2B, a portion surrounded by a dotted line is integrated on a one-chip IC. More specifically, in addition to camera process system circuits such as the A/D converter 5 for converting an image pickup signal output from the image pickup element 3 into a digital signal, the above-mentioned circuits 6 to 12 for separating and generating a luminance signal and a color signal from the image pickup signal, which is converted into the digital signal by the A/D converter 5, the gamma circuit 13 for performing gamma correction of the luminance signal, and the like, filters including low-pass and high-pass filters for extracting signals used in focus detection from the image pickup signal, more specifically, predetermined low- and high-frequency components in the image pickup signal, a distance measurement frame generation circuit comprising the frame generator 54 for generating distance measurement frames L, C, and R whose positions, sizes, and the like are controlled in accordance with the photographing state or operation information, the plurality of peak hold circuits, buffers, and integration circuits for processing focus signals corresponding to portions in the distance measurement frames L, C, and R to convert them into evaluation signals representing focusing states, a signal processing circuit for performing predetermined arithmetic operations and correction of the signals representing the focusing states in the distance measurement frames, and the microcomputer interface for exchanging various data such as the generated evaluation signals representing the focusing states with a system control microcomputer of the camera are integrated on a one-chip IC.

Since the circuits are integrated on a one-chip IC, control is facilitated as compared to a conventional AF system wherein the respective functions are realized by separate circuits, these circuits and a microcomputer formed on another chip are coupled to each other via independent interfaces, and various control operations are performed via data communications, and the operation timings of the respective circuits can be uniformly controlled. Since various functions necessary for AF control can be integrated on a single chip, the number of distance measurement frames and their positions in the photographing field can be arbitrarily switched in response to an external control command or can be automatically switched in accordance with the photographing state. Therefore, the one-chip IC can satisfy various requirements in accordance with system design, and versatility can be remarkably improved.

Since the output signal from the image pickup element is A/D converted at the input stage of the IC, the entire processing can be realized by digital arithmetic processing. Therefore, arithmetic operations are facilitated, and high-speed processing can be attained, thus realizing a highly reliable, high-speed AF one-chip IC.

Figure 3:
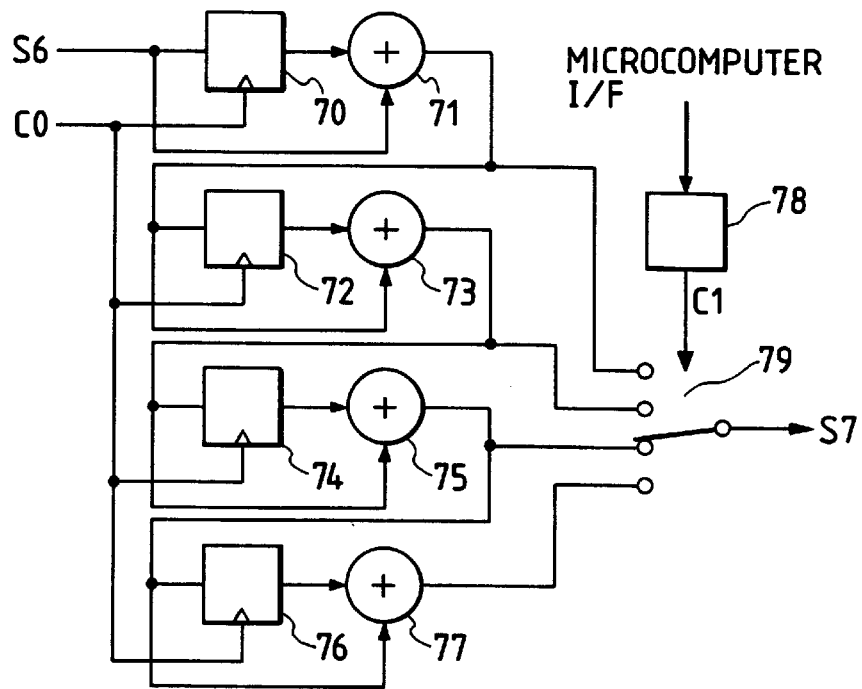
FIG. 3 is a block diagram showing a schematic arrangement of a TE-LPF (low-pass filter for even lines) in the block diagram in FIGS. 2A and 2B.

FIG. 3 is a block diagram showing the schematic arrangement of the TE-LPF 14 shown in FIGS. 2A and 2B. In this TE-LPF 14, the signal S6 output from the gamma circuit 13 is latched by a register 70 at the timing of the reference clock C0 output from the reference clock generator 60. An adder 71 adds the input and output signals of the register 70, and outputs the sum to a switch 79 and a register 72.

The register 72 and registers 74 and 76 latch the input signal at the timing of the reference clock C0. An adder 73 adds the input and output signals of the register 72, and outputs the sum to the switch 79 and the register 74. An adder 75 adds the input and output signals of the register 74, and outputs the sum to the switch 79 and the register 76. An adder 77 adds input and output signals of the register 76, and outputs the sum to the switch 79.

A register 78 stores a filter characteristic value supplied from the microcomputer 55 via the microcomputer interface 53. The switch 79 selects one of the above-mentioned sums on the basis of the filter characteristic value from the register 78, and outputs the selected value as the signal S7.

Figure 4:
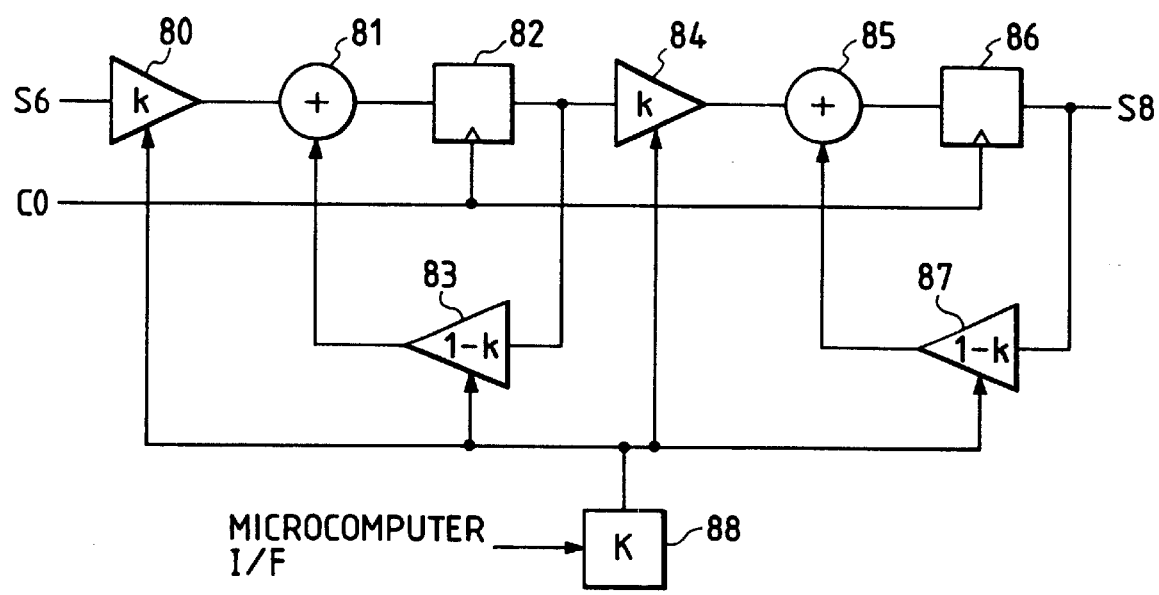
FIG. 4 is a block diagram showing a schematic arrangement of an FE-LPF (low-pass filter for odd lines) in the block diagram in FIGS. 2A and 2B.

FIG. 4 is a block diagram showing the schematic arrangement of the FE-LPF 15 shown in FIGS. 2A and 2B. In this FE-LPF 15, the signal S6 output from the gamma circuit 13 is multiplied with K by a coefficient multiplier 80, and the product is input to an adder 81. The adder 81 also receives an output signal from a coefficient multiplier 83, adds the output signals from the two coefficient multipliers 80 and 83, and supplies the sum to a register 82. Note that the value "K" in the multiplication with K represents a filter characteristic value K (to be described later; the same applies to the following description).

The register 82 latches the sum supplied from the adder 81 in accordance with the reference clock C0 from the reference clock generator 60, and outputs the latched signal to the coefficient multiplier 83 and a coefficient multiplier 84. The coefficient multiplier 83 multiplies the sum output from the register 82 with (1-K), and outputs the product to the adder 81. The coefficient multiplier 84, a coefficient multiplier 87, an adder 85, and a register 86 have substantially the same functions as those of the coefficient multipliers 80 and 83, the adder 81, and the register 82, except that the input signal is the output (the sum) from the register 82. A filter characteristic value K supplied from the microcomputer 55 is stored in a register 88, and is supplied to the coefficient multipliers 80, 83, 84, and 87.

Figure 5:
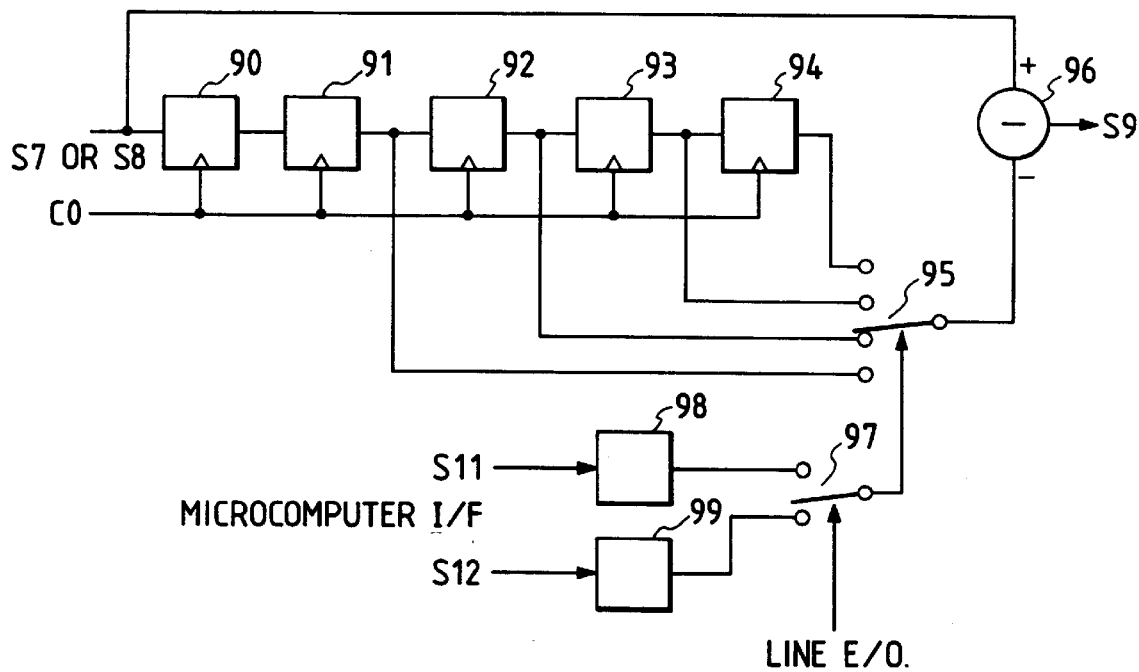
FIG. 5 is a block diagram showing a schematic arrangement of an HPF (high-pass filter) in the block diagram in FIGS. 2A and 2B.

FIG. 5 is a block diagram showing the schematic arrangement of the HPF 17 in FIGS. 2A and 2B. In this HPF 17, the luminance signal S7/S8 of an even/odd line switched and selected by the switch 16 is input to a register 90 and a subtracter 96. The luminance signal S7/S8 of the even/odd line input to the register 90 is sequentially transferred to registers 91, 92, 93, and 94 in accordance with the reference clock C0 from the reference clock generator 60. One of the outputs from the registers 91, 92, 93, and 94 is selected by a switch 95, and is input to the subtracter 96. The subtracter 96 calculates the difference between the luminance signal S7/S8 of the even/odd line and the signal selected by the switch 95, and outputs a signal S9 representing the calculated difference.

A register 98 stores a filter characteristic value of an even line supplied from the microcomputer 55 via the microcomputer interface 53, and a register 99 stores a filter characteristic value of an odd line. A switch 97 is switched by the signal Line E/O as a signal for identifying whether the current horizontal line is an even or odd line. When the signal Line E/O indicates an even line (Line E signal), the switch 97 outputs the filter characteristic value of an even line in the register 98 as its selection signal; when the signal Line E/O indicates an odd line (Line O signal), the switch 97 outputs the filter characteristic value of an odd line in the register 99 as its selection signal. More specifically, these filters are realized by digital filters in the AF IC AFP. In this embodiment, the filter characteristic value of an even line is set to have a higher pass frequency than that of the filter characteristic value of an odd line. More specifically, two different HPFs having different frequency bands can be realized in correspondence with even and odd lines, and information from these HPFs can be obtained during one field period, thus achieving high-speed AF processing.

FIG. 6 is an explanatory view showing frame images in the photographing field and for explaining the timings in the overall photographing field. An outer frame shown in FIG. 6 represents an effective field region of the image pickup signal output from the image pickup element 3. Inner horizontally three-divided frames are focusing gate frames, and the L frame in the left column, the C frame in the central column, and the R frame in the right frame are formed by the above-mentioned gate signals output from the frame generator 54.

In order to further divide these L, C, and R frames in the vertical direction, a reset signal is output three times for each of the L, C, and R frames within one photographing field, i.e., reset timing signals LR1, LR2, LR3, CR1, CR2, CR3, RR1, RR2, and RR3 are generated, thereby resetting the integration circuits, the peak hold circuits, and the like. Data transfer signals IR1, IR2, and IR3 are generated to transfer the integration values and peak hold values to the corresponding buffers. Even field scanning is indicated by a solid line, and odd field scanning is indicated by a dotted line. In even and odd fields, the output from the TE-LPF 14 is selected for an even line, and the output from the FE-LPF 15 is selected for an odd line.

More specifically, scanning operations for the entire photographing field will be examined below. In scanning in the distance measurement frames, the three areas are reset at the upper left edges of the L, C, and R frames by LR1, CR1, and RR1, and when scanning of these three areas is completed, i.e., at the timing IR1, peak values corresponding to even and odd lines of these three areas are output.

Similarly, peak values are output in correspondence with the middle three areas starting from LR2, CR2, and RR2, and the lower three areas starting from LR3, CR3, and RR3.

With the above-mentioned operations, the peak values of focus signals (high-frequency components) in the nine distance measurement frames can be obtained. Therefore, the focusing state in the photographing field can be detected over a wide range within a short period of time, and the distance measurement frame corresponding to a photographing state can be selected.

As described above, in the AF IC of the present invention, evaluation values TE peak hold and FE peak hold obtained by holding peak values in units of even and odd lines in the nine distance measurement frames, evaluation values TE Line peak sum and FE Line peak sum obtained by integrating the peak hold values in units of even and odd lines in the nine distance measurement frames, Max-Min evaluation values as differences between the maximum and minimum values of the peak hold values in units of lines in the nine distance measurement frames, and peak hold values Y peak hold of a luminance Y in the nine distance measurement frames are generated. These AF evaluation signals are output to the external system control microcomputer 55 via the microcomputer interface 53, and are used in AF control.

Also, an interrupt signal for issuing an interrupt request to the system control microcomputer 55 upon execution of processing based on the outputs from the AF IC is generated.

More specifically, since the AF control is executed as interrupt processing, parallel processing with other processing operations is allowed in the whole system, and a system with high efficiency can be realized.

Since the AF IC AFP of the present invention performs processing such as Y/C separation at the input portion from the image pickup element, and this processing portion can be commonly used by a video signal processing circuit (not shown), the IC of the present invention satisfactorily matches with a video signal processing system of a video camera, and has high versatility.

FIG. 7 is a graph showing the input/output characteristics of the gamma circuit 13 shown in FIGS. 2A and 2B. The input signal S5 is plotted along the abscissa, and the output signal S6 is plotted along the ordinate. Note that data representing the input/output characteristics are stored in the gamma circuit 13 in the form of a table.

The utilization methods, in in-focus control, of the TE/FE peak evaluation values, TE line peak integration evaluation value, FE line peak integration evaluation value, Y peak evaluation value, and Max-Min evaluation value in each frame will be described below.

Since the TE/FE peak evaluation values are respectively evaluation values representing the in-focus degrees in even and odd lines, and are non-integrated peak hold values close to real-time values, they have relatively low object dependency, and suffer less the influence of, e.g., a camera shake. Therefore, the TE/FE peak evaluation values are suitable for in-focus degree discrimination and redriving discrimination, which require quick discrimination. Since the TE line peak integration evaluation value and the FE line peak integration evaluation value are stable evaluation values free from noise due to the integration effect although they also represent the in-focus degrees, these values suffer less the influence of instantaneous noise, and are suitable for direction discrimination. Furthermore, since both the TE (even line) peak evaluation value and the TE line peak evaluation value are obtained by extracting higher high-frequency components than those of the FE values, they are suitable for in-focus control near an in-focus position. In contrast to this, the FE (odd line) values are suitable for a considerably out-of-focus state far from an in-focus position. Since the Y (luminance) peak evaluation value and the Max-Min evaluation value do not depend much on the in-focus degree but depend on an object in question, they are suitable for determining an object condition so as to reliably execute in-focus degree discrimination, redriving discrimination, and direction discrimination. More specifically, a high- or low-luminance object is discriminated based on the Y peak evaluation value, and the contrast is discriminated based on the Max-Min evaluation value, so as to estimate and correct the size of a hill defined by the TE/FE peak evaluation values, TE line peak integration evaluation value, and FE line peak integration evaluation value, thus performing optimal in-focus control.

Figure 8B:
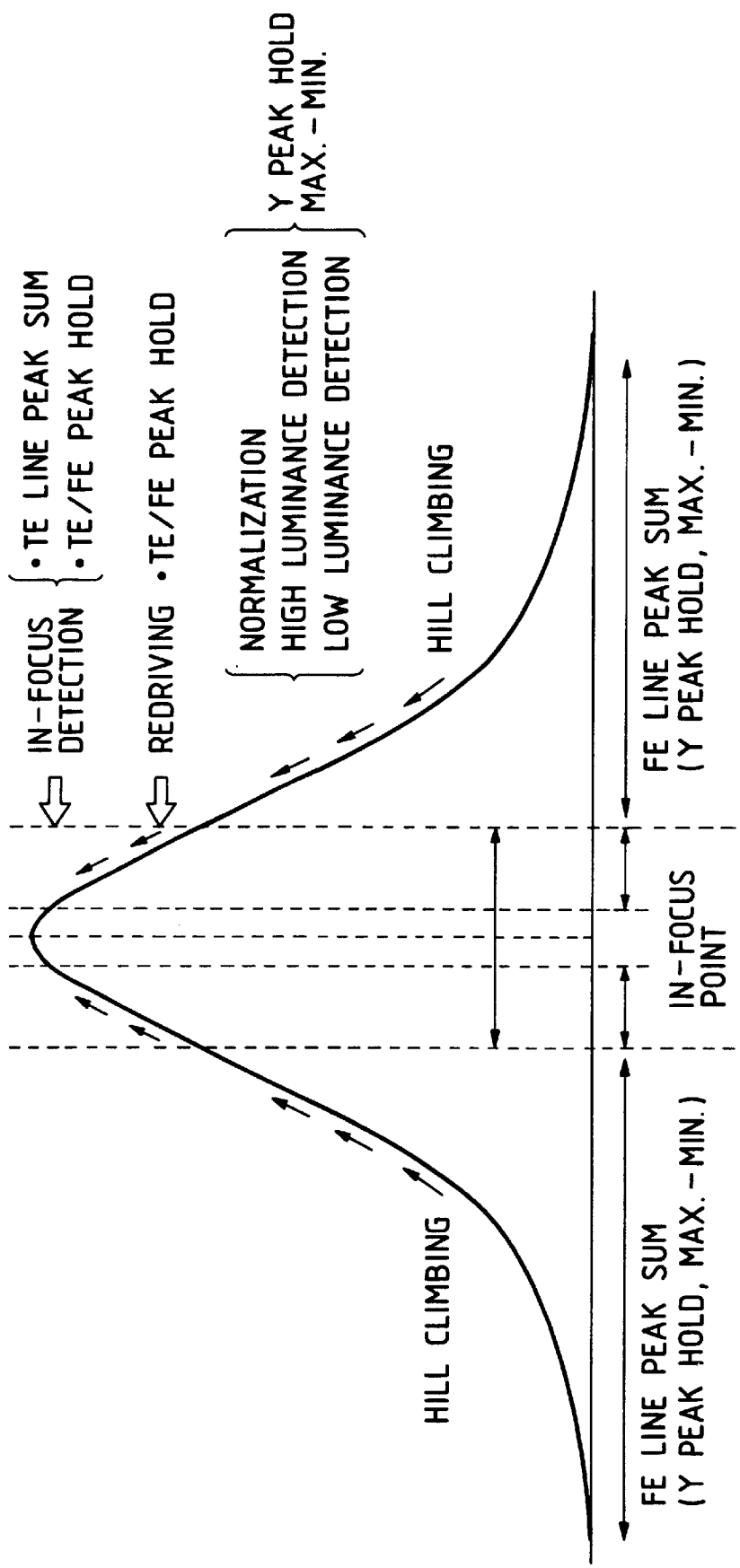

The AF operation will be described below with reference to the flow chart in FIG. 8A and an operation explanatory view in FIG. 8B.

When the system is driven (step S1), the microcomputer 55 executes hill-climbing control by executing speed control based on the level of the TE/FE peak evaluation values, improving detection precision using the TE line peak integration evaluation value of the high frequency component near a hill top, and executing direction control mainly using the FE line peak integration evaluation value of the low frequency component having horizontally spread hill characteristics at the foot of the hill (step S2). Then, the microcomputer 55 discriminates a hill top by calculating a maximal value of the level on the basis of the absolute values of the TE/FE peak evaluation values and changes in TE line peak integration evaluation value (step S3). The microcomputer 55 stops the control at the highest-level point, and waits for redriving (step S4).

In the waiting state for redriving, the microcomputer 55 redrives the system when it detects a decrease in level of the TE/FE peak evaluation values (step S5). In the loop of the AF operation, the degree of execution of speed control using the TE/FE peaks, the absolute level used upon discrimination of the hill top, the change in TE line peak integration evaluation value, and the like are determined based on a prediction result which is obtained by predicting the size of a hill by discriminating an object using the Y peak evaluation value and the Max-Min evaluation value.

Furthermore, near-distance priority focusing control is performed using the nine focusing frame data. The Y peak evaluation values in the nine focusing frames are checked to exclude, from the focusing control, frames which have reached a saturation level. Changes in TE line peak integration evaluation values and FE line peak integration evaluation values of all focusing frames whose Y peaks have not reached the saturation level are checked. When the evaluation values in all the frames are increasing in the same direction, the above-mentioned AF control is executed using the evaluation value having the highest level. However, when the increasing directions of the evaluation values are different from each other, AF control is performed using the evaluation value having the highest level of those of frames whose evaluation values increased upon driving in the nearest direction, thus allowing the near-distance priority focusing control.

When the direction control is executed using the TE and FE line peak integration values in step S2, or when the hill top is discriminated based on the TE/FE peak evaluation values or changes in TE line peak integration evaluation value, since the levels of the evaluation values vary due to a difference in object or a change in brightness or contrast, focus detection may be performed by normalizing the evaluation values by the Max-Min evaluation value so as to eliminate the influence of the change in contrast, thus realizing focus detection with higher precision.

The TE/FE peak evaluation values, the TE line peak integration evaluation value, and the FE line peak integration evaluation value may be normalized by the Y peak evaluation value in place of the Max-Min evaluation value. In this case, the influence of the change in brightness of an object can be eliminated.

When the evaluation values are used in the processing in steps S2, S3, S4, and S5, the Y peak evaluation values in the nine focusing frames are detected. Thus, evaluation values for high-precision focus detection cannot be obtained from focusing frames with saturated luminance levels. For this reason, when the detected evaluation values of the corresponding frames are excluded upon execution of focus detection, focus control can be stably performed with high precision.

As described above, according to the above-mentioned AF apparatus, since the peak values and (maximum value - minimum value) of the luminance signals in a plurality of focus detection regions are detected, and focus detection signals in the plurality of focus detection regions are corrected by these values, in-focus states of every objects can be stably achieved independently of the states of the objects and the photographing conditions.

Since the above-mentioned various functions necessary for AF control are integrated in a one-chip IC, an AF function, which can achieve in-focus states of every objects independently of the states of the objects and the photographing conditions, can be easily mounted in a camera, and the number of distance measurement frames and their positions in the photographing field can be arbitrarily switched in response to an external control command or can be automatically switched in accordance with the photographing state. Therefore, various requirements in accordance with system design can be met, and versatility can be remarkably improved.

The second embodiment of the present invention will be described below. The second embodiment discloses an AF apparatus which can achieve high-speed, high-precision AF control. In this embodiment as well, high-speed AF control is achieved, focus evaluation values can be detected from a video signal without any time lag to realize quick AF control, and AF evaluation values are obtained in units of horizontal scanning lines. Of course, the AF IC in the above-mentioned first embodiment can be used.

This embodiment will now be described in turn from its background.

In recent years, automatic focus detection apparatuses used in video equipment such as a video camera, an electronic still camera, and the like popularly adopt a so-called hill-climbing system which extracts a high-frequency component in a video signal from an image pickup element such as a CCD as a focus signal, and moves a photographing lens (movable optical means) of an image pickup optical system to an in-focus position by executing driving control for maximizing the focus signal (in-focus evaluation signal), in place of an infrared projection system for performing AF control by triangular distance measurement. The hill-climbing automatic focus detection apparatus does not require any special optical members for focusing, and can precisely perform focusing independently of far and near distances.

Figure 15:
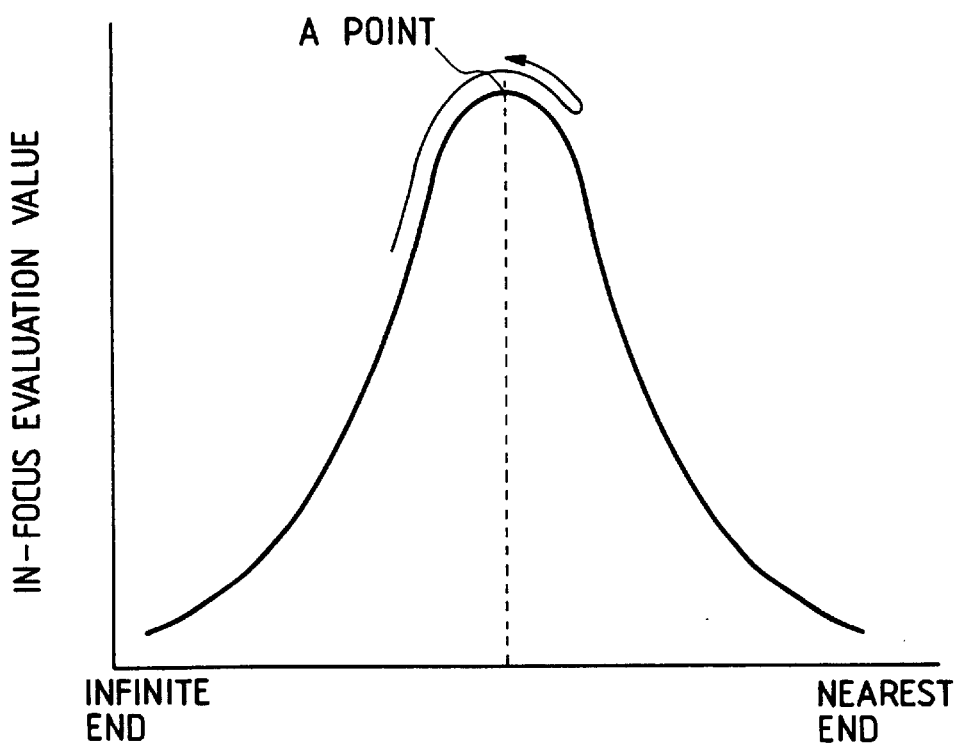
FIG. 15 is a graph for explaining an operation of a conventional automatic focus detection apparatus.

FIG. 15 is an explanatory view of focus detection based on the hill-climbing system. In a considerably out-of-focus state, a photographing lens (focusing lens) as movable optical means is moved at high speed. In this case, when a focus signal increases, the photographing lens is kept moved in the same direction; when a focus signal decreases, the photographing lens is moved in the opposite direction. That is, the photographing lens is always moved in a direction to increase an in-focus evaluation value obtained from the focus signal. When the focus signal exceeds a predetermined value, the moving speed of the photographing lens is decreased to slowly climb a hill, and the movement of the photographing lens is stopped at a point A corresponding to the maximum in-focus evaluation value. In this case, a focus signal is extracted from a video signal using a plurality of filters having different frequency bands, and focus signals from these filters are simultaneously monitored, or the focus signal is monitored by switching the filters for each vertical synchronization signal, thereby discriminating a state near an in-focus state or a considerably out-of-focus state.

In focus detection of the hill-climbing system, wobbling (finely reciprocally oscillating a focusing lens along the optical axis direction to discriminate a direction) is performed as an auxiliary operation of AF control. Normally, a change in focus signal is detected in synchronism with this wobbling, the moving direction to achieve an in-focus state of the photographing lens is calculated, and the photographing lens is moved in the calculated direction to execute in-focus control.

In focus detection of the hill-climbing system, when focus signals obtained from the plurality of filters having different frequency bands are always fetched, absolute value circuits and peak hold circuits are required in correspondence with the number of filters, and the circuit arrangement is complicated. When the plurality of filters having different frequency bands are switched in correspondence with vertical synchronization signals, the above-mentioned circuits can be commonly used by the filters. However, in this case, when, e.g., three filters are used, a focus detection result can only be obtained every three vertical synchronization signals. For this reason, a temporal shift occurs between focus detection information and the current video signal, and adversely affects focus detection control precision.

In focus detection of the hill-climbing system, a so-called out-of-focus stop phenomenon that an in-focus state of an object to be focused cannot be attained due to a spurious resolution or far/near contention. For example, when a user carries a video camera set in an AF mode while holding a hand grip with his or her hand, the direction of the video camera continuously changes, and the focusing lens is performing a high-speed search operation for searching an object. When the user directs the video camera to an object to be photographed from this state, and performs an image recording/photographing operation, the focusing lens is normally in an out-of-focus state. In particular, when the blur amount is small, since the driving speed of the photographing lens is low, a spurious resolution is easily focused, and the out-of-focus stop phenomenon tends to occur. When an image recording operation is started in this state, since the image recording operation is performed in an out-of-focus state, the user must shake the video camera or must perform a manual focusing operation, resulting in a troublesome operation.

Furthermore, in focus detection of the hill-climbing system, in a considerably out-of-focus state wherein a focus signal does not change even after wobbling (finely reciprocally oscillating a focusing lens along the optical axis direction to discriminate a direction), only a change in noise signal can often be detected, and the calculation result of the moving direction becomes unreliable. In this case, the photographing lens is moved in the calculated direction in any way, and the driving operation of the photographing lens is continued until the focus signal starts to change in accordance with the driving operation of the photographing lens. In this case, if the driving direction coincides with an in-focus point direction, an in-focus state can be easily attained. Otherwise, an in-focus state is attained after the photographing lens is moved to the infinite or nearest end, and the moving direction is reversed, thus requiring a long time for attaining an in-focus state.

This embodiment has been made in consideration of the current situation of automatic focus detection described above, and has as its first object to provide an automatic focus detection apparatus which can eliminate a time lag between focus detection information and the current video signal, and can perform high-precision focus detection.

It is the second object of this embodiment to provide an automatic focus detection apparatus which can prevent an out-of-focus stop phenomenon at the beginning of image recording, and can always perform image recording in a satisfactory focusing state.

Furthermore, it is the third object of this embodiment to provide an automatic focus detection apparatus which can attain an in-focus state with a high probability from an out-of-focus state within a short period of time.

According to this embodiment, in order to achieve the first object, there is disclosed an automatic focusing apparatus for performing focusing by detecting a high-frequency component in an image pickup signal, comprising: a plurality of band-pass filters having different frequency bands; switching means for switching the plurality of band-pass filters; horizontal peak hold means for holding a peak value of an output from the band-pass filter selected by the switching means in synchronism with a horizontal synchronization signal; vertical peak hold means for holding a peak value of an output from the horizontal peak hold means in a vertical direction; and control means for performing focusing on the basis of the outputs from the horizontal and vertical peak hold means.

In order to achieve the second object, according to this embodiment, there is disclosed an automatic focus detection apparatus comprising: in-focus detection means for detecting an in-focus state on the basis of a focus signal extracted from a video signal; discrimination means for discriminating a transition from an image recording standby state to an image recording state; and control means for, when the discrimination means discriminates the transition in the image recording standby state wherein the in-focus detection means detects the in-focus state, redriving the in-focus detection means to perform an in-focus operation again.

Furthermore, in order to achieve the third object, there is disclosed an automatic focus detection apparatus comprising: in-focus detection means for detecting an in-focus state on the basis of a focus signal extracted from a video signal; and control means for, when the in-focus detection means cannot detect a driving direction of a focus lens on the basis of the focus signal, causing the in-focus detection means to move the focusing lens in a direction determined by a position of the focusing lens and a predetermined standard object position.

In this apparatus, a video signal output from an image pickup optical system is input to a plurality of band-pass filters having different frequency bands, and filtered focus signals output from the band-pass filters are sequentially selectively output by switching means. The selected focus signal is converted into an absolute value by an absolute value circuit. The peak value of the focus signal, which is converted into the absolute value, is held by a horizontal peak circuit in synchronism with a horizontal synchronization signal by a horizontal peak hold circuit, and the peak-hold focus signal is selectively input to a plurality of vertical peak hold circuits by switching means to be sequentially peak-held in the vertical direction. In this manner, focus signals are obtained by filtering in real time, and focusing means can precisely move movable optical means to an in-focus position determined by in-focus detection means on the basis of the focus signals output from the vertical peak hold circuits.

When discrimination means discriminates a transition from an image recording standby state to an image recording state in an image recording standby state wherein the in-focus detection means determines an in-focus state, control means redrives in-focus control by causing the focusing means to move the movable optical means from a position which is determined as an in-focus position, thus performing image recording free from any out-of-focus stop phenomenon.

When the driving direction of the movable optical means cannot be detected on the basis of a focus signal, the control means operates the focusing means to move the movable optical means in a direction determined by the position of the movable optical means and a standard object position, thus quickly attaining an in-focus operation.

The third embodiment of the present invention will now be described. The third embodiment will be described below with reference to FIG. 9.

Figure 9:
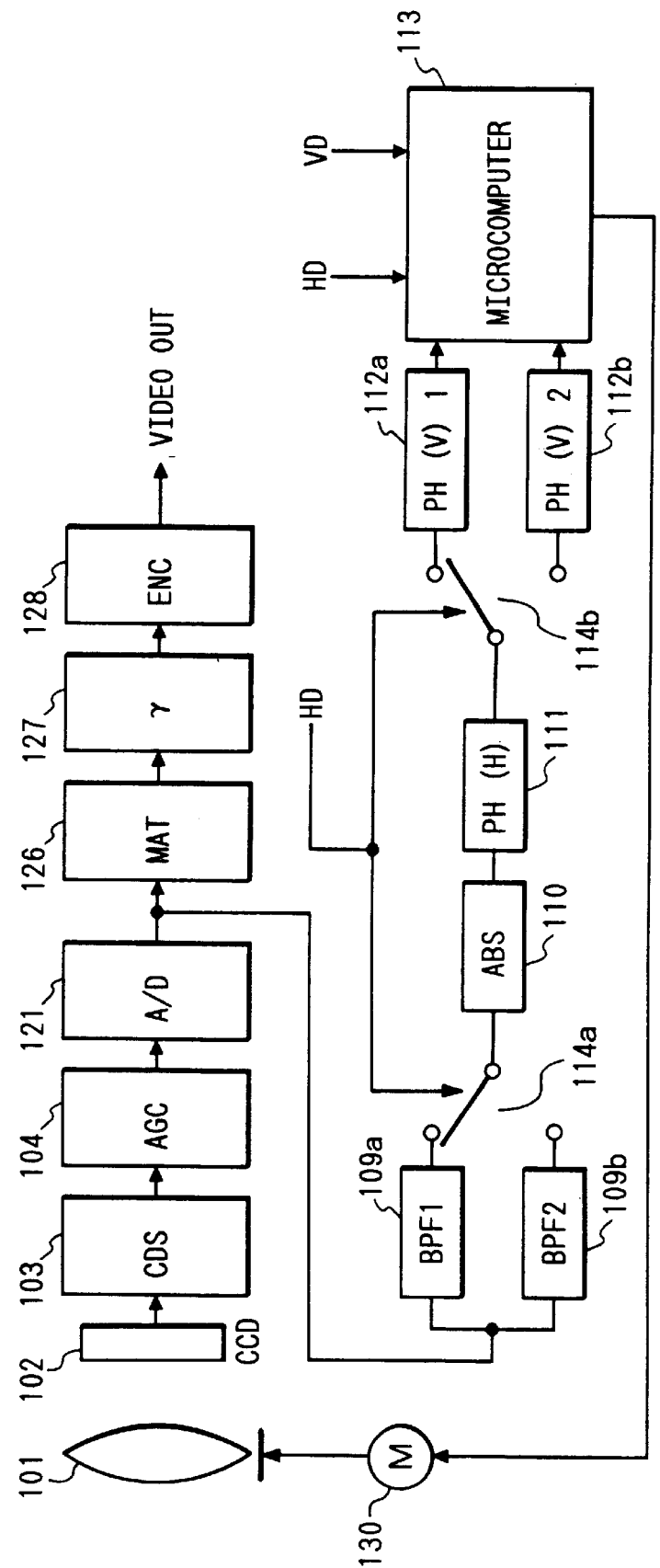
FIG. 9 is a block diagram showing the second embodiment of an AF apparatus according to the present invention.

Referring to FIG. 9, a focusing lens 101 is used for performing focusing in a photographing optical system for performing focusing and zooming operations. The focusing lens 101 focuses an optical image of an object on the image pickup surface of an image pickup element 102 such as a CCD, and the optical image is photoelectrically converted by the CCD 102, thereby obtaining a video signal of the object. The video signal is sampled and held by a CDS circuit 103 connected to the CCD 102, and is amplified by an AGC circuit 104 connected to the CDS circuit 103. The amplified video signal is then A/D-converted by an A/D converter 121 connected to the AGC circuit 104. The A/D-converted video signal is subjected to matrix processing in a matrix circuit 126 connected to the A/D converter 121, and is then subjected to gamma correction processing in a gamma circuit 127 connected to the matrix circuit 126. The video signal is subjected to signal processing (e.g., addition of synchronization signals) in an encoder circuit 128 connected to the gamma circuit 127 so as to be converted into a television signal of an applicable standard. The television signal is supplied to a video recorder, an electronic view finder, and the like.

At the same time, the video signal A/D-converted by the A/D converter 121 is input to a plurality of band-pass filters (BPFs) 109a and 109b, which are connected in parallel with the A/D converter 121, and have different frequency bands, and the BPFs 109a and 109b respectively output focus signals obtained by band-passing the video signal. The output terminals of the BPFs 109a and 109b are connected to an absolute value circuit 110 via a selection switch 114a, which is switched in synchronism with a horizontal synchronization signal HD. The focus signals output from the BPFs 109a and 109b are selectively input to the absolute value circuit 110 by the selection switch 114a in correspondence with each horizontal synchronization signal, and the peak value, in the horizontal direction, of the signal output from the absolute value circuit 110 is held by a horizontal peak hold circuit 111.

The horizontal peak hold circuit 111 is connected, via a selection switch 114b, in parallel with vertical peak hold circuits 112a and 112b respectively for even and odd lines. The peak values of the horizontally peak-hold focus signals for even and odd lines are respectively and alternately held by the vertical peak hold circuits 112a and 112b upon switching of the selection switch 114b, which is interlocked with the selection switch 114a, in synchronism with the horizontal synchronization signal. The focus signals, which are peak-held respectively in even and odd lines, are input to a microcomputer 113 as AF control means connected to the vertical peak hold circuits 112a and 112b. The microcomputer 113 moves the focusing lens 101 to an in-focus position by driving a motor 130 connected to the microcomputer 113 on the basis of the focus signals with reference to a detection signal from an encoder (not shown) for detecting the position of the focusing lens 101, and a detection signal from an iris encoder (not shown) for detecting the degree of opening of an iris (not shown).

Since the focus signals output from the BPFs 109a and 109b are switched in correspondence with each horizontal synchronization signal, the focus signals from the filters having different frequency bands can be obtained in real time, and the focus signals from the plurality of filters can be obtained in correspondence with one vertical synchronization period without causing a any time delay between focus detection information and the current video signal, thus attaining high-precision in-focus control.

In this manner, according to the third embodiment, the focus signals from the BPFs 109a and 109b having different frequency bands can be obtained within a short period of time, and high-precision in-focus control can be attained without causing any time delay between focus detection information and the current video signal. In addition, the circuit arrangement can be simplified and the manufacturing cost can be reduced by commonly using the absolute value circuit 110, the horizontal peak hold circuit 111, and the vertical peak hold circuits 112a and 112b for each frequency band.

Figure 10:
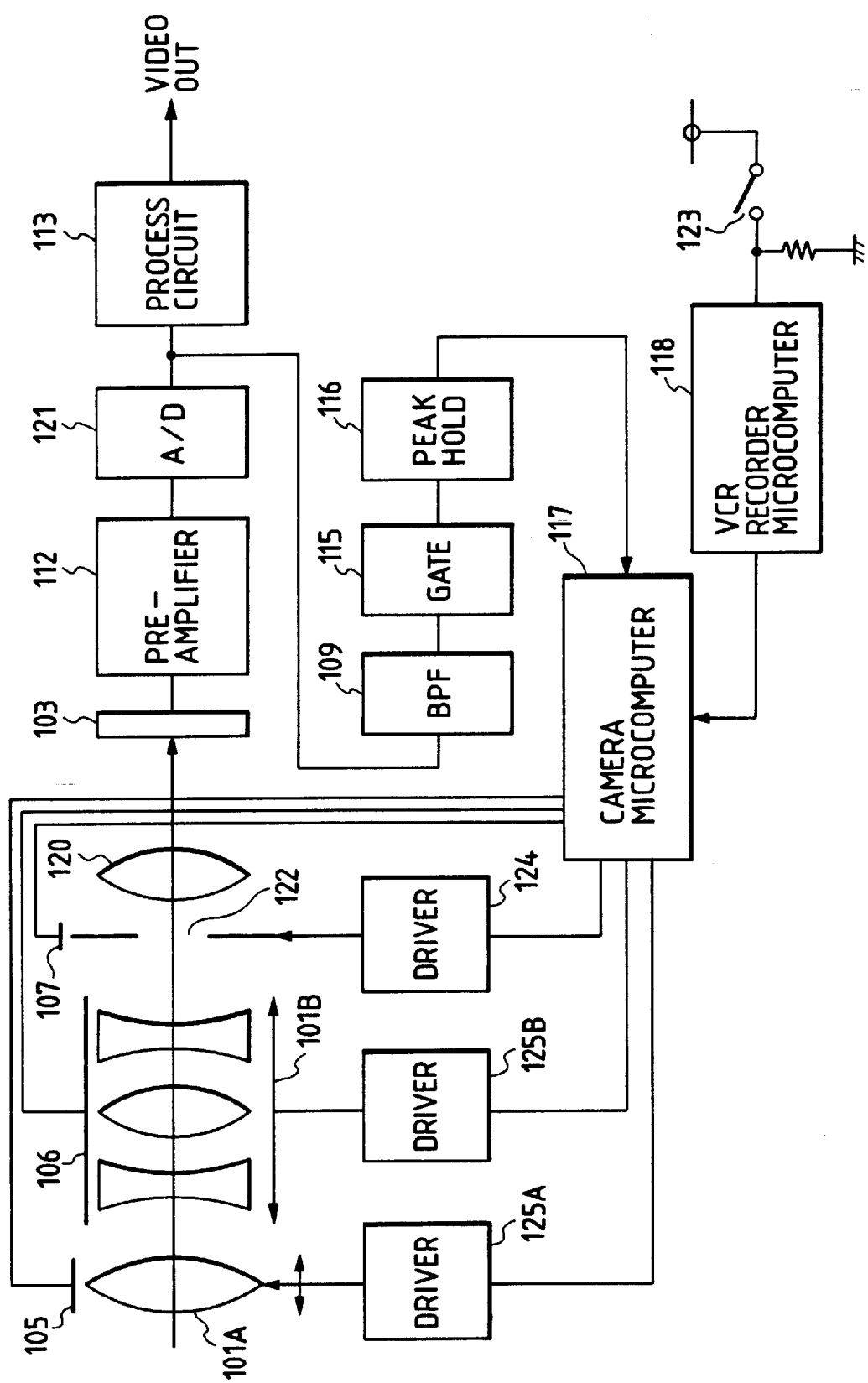
FIG. 10 is a block diagram showing the third embodiment of an AF apparatus according to the present invention.
Figure 11:
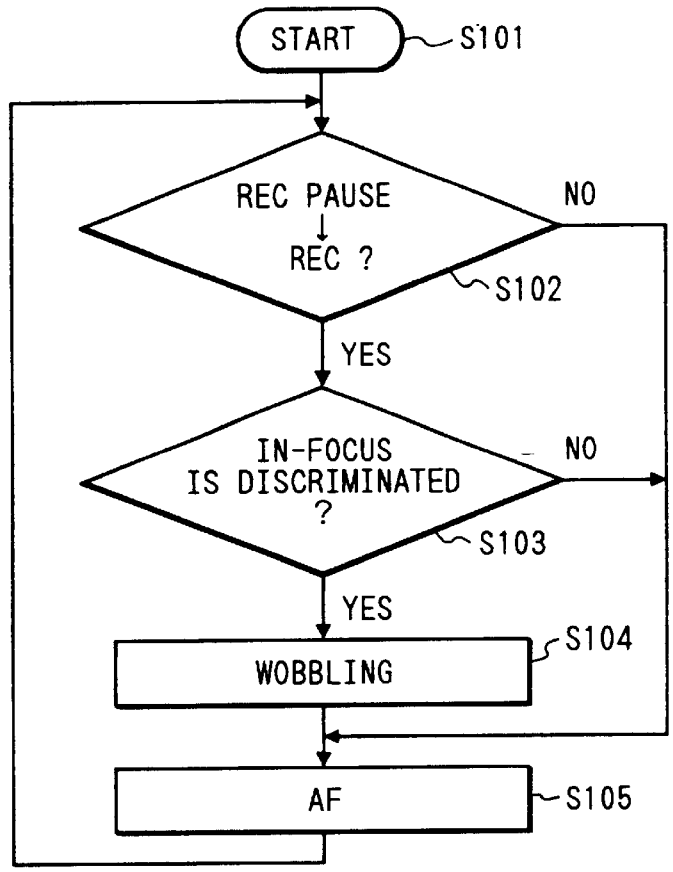
FIG. 11 is a flow chart showing an operation of a camera microcomputer.
Figure 12:
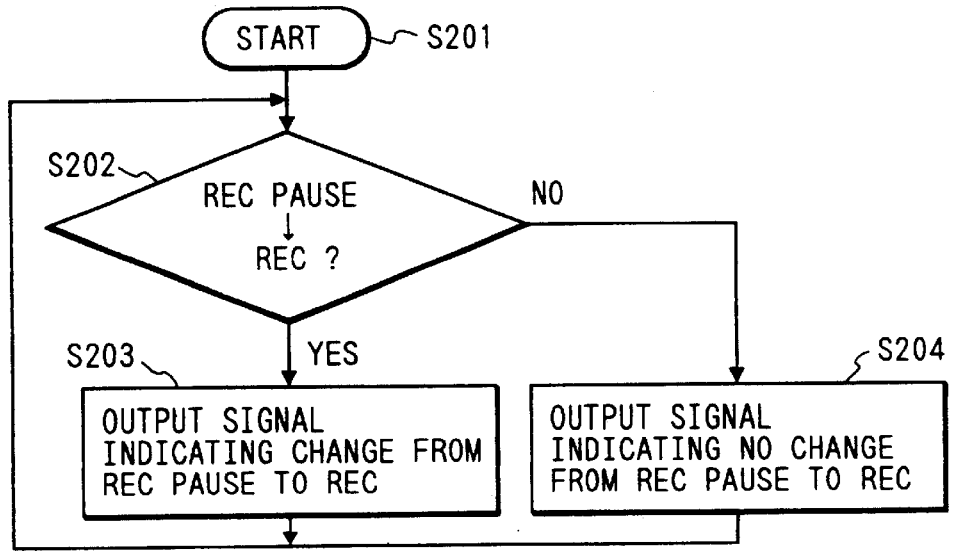
FIG. 12 is a flow chart showing an operation of a recorder microcomputer.

The fourth embodiment will be described below with reference to FIGS. 10 to 12. FIG. 10 is a block diagram showing the arrangement of the fourth embodiment, FIG. 11 is a flow chart showing an operation of a camera microcomputer, and FIG. 12 is a flow chart showing an operation of a recorder microcomputer.

Referring to FIG. 10, a focusing lens 101A is movable along the optical axis by a focusing driver 125A. A zoom lens system 101B, which is movable along the optical axis by a zoom driver 125B, is arranged after the focusing lens 101A, and the focusing lens 101A and the zoom lens 101B constitute movable optical means. An iris 122 whose degree of opening is controlled by an iris driver 124 is arranged after the zoom lens system 1B, and a correction lens 120 is arranged after the iris 122.

The focusing lens 101A, the zoom lens system 101B, the iris 122, and the correction lens 120 focus an optical image of an object on the image pickup surface of a CCD 103 arranged after the correction lens 120. The optical image is photoelectrically converted by the CCD 102, thereby obtaining a video signal. The video signal is amplified by a preamplifier 112 connected to the CCD 103, and is A/D-converted by an A/D converter 121 connected to the preamplifier 112. The A/D-converted video signal is input to a process circuit 113 connected to the A/D converter 121. The process circuit 113 performs gamma correction processing, blanking processing, and addition processing of synchronization signals to the input video signal to convert the video signal into a television signal of a desired standard. The television signal is supplied to a video recorder, an electronic view finder, and the like.

At the same time, the video signal A/D-converted by the A/D converter 121 is input to a BPF 109 connected to the A/D converter 121. The BPF 109 filters a high-frequency component in the video signal as a focus signal, and the obtained focus signal is input to a gate circuit 115 connected to the BPF 109. The gate circuit 115 performs gate processing for selecting a signal component in a focus detection region in a photographing field from the focus signal, and the gated focus signal is input to a peak hold circuit 116 connected to the gate circuit 115. Thus, only the maximum value of the focus signal is input to a camera microcomputer 117 connected to the peak hold circuit 116.

The output terminals of the camera microcomputer 117 are connected to the focusing driver 125A, the zoom driver 125B, and the iris driver 124, and its input terminals are connected to a focusing encoder 105 for detecting the position of the focusing lens 101A, a zoom encoder 106 for detecting the position of the zoom lens system 101B, an iris encoder 107 for detecting the degree of opening of the iris 122, and a recorder microcomputer 118 for outputting a signal corresponding to an ON/OFF state of an image recording trigger switch 123. The camera microcomputer 117 supplies a control command to the focusing driver 125A and the zoom driver 125B on the basis of the focus signal from the peak hold circuit 116 with reference to the focusing lens position signal from the focusing encoder 105, the zoom lens position signal from the zoom encoder 106, the opening degree signal from the iris encoder 107, and the signal from the recorder microcomputer 118, thereby executing an in-focus control operation of the focusing lens 101A and the zoom lens system 101B. In this case, in the fourth embodiment, when an image recording standby state transits to an image recording state, the camera microcomputer 117 makes control to prevent image recording in an out-of-focus state focused with a spurious resolution.

The operation of the camera microcomputer 117 will be described below with reference to the flow chart in FIG. 11. When an image recording operation by a video camera set in an AF mode is started in step S101, the signal from the recorder microcomputer 118 is fetched to check in step S102 if the image recording standby (REC PAUSE) state transits to the image recording (REC) state. If YES in step S102, the flow advances to step S103 to discriminate if an in-focus state is attained. If YES in step S103, the flow advances to step S104 to perform a wobbling operation for discriminating an in-focus direction by defocusing the focusing lens 101A, i.e., by reciprocally and slightly oscillating the lens 101A along the optical axis direction. The flow then advances to step S105 in a defocus state, and an AF operation is performed on the basis of the direction discriminated as a result of the wobbling operation in step S104.

If it is determined in step S102 that the REC PAUSE state does not transit to the REC state, or if it is determined in step S103 that an in-focus state is not attained, the flow jumps to step S105 to perform a normal AF operation.

The operation of the recorder microcomputer 118 will be described below with reference to the flow chart in FIG. 12. The operation is started in step S201, and the flow advances to step S202. In step S202, it is checked based on the ON/OFF state of the image recording trigger switch 123 if the REC PAUSE state transits to the REC state. If YES In step S202, the flow advances to step S203 to output, to the camera microcomputer 117, a signal indicating that the REC PAUSE state transits to the REC state. On the other hand, if NO in step S202, the flow advances to step S204 to output, to the camera microcomputer 117, a signal indicating that the REC PAUSE state does not transit to the REC state.

As described above, according to the fourth embodiment, when an image recording operation is performed by the video camera set in the AF mode, if an in-focus state is discriminated when it is discriminated that the REC PAUSE state transits to the REC state, the wobbling operation for discriminating an in-focus direction by defocusing the focusing lens 101A is performed, and in-focus control is redriven. Therefore, the out-of-focus stop phenomenon can be automatically prevented, and the image recording operation can always be performed in a satisfactory focusing state.

Figure 13:
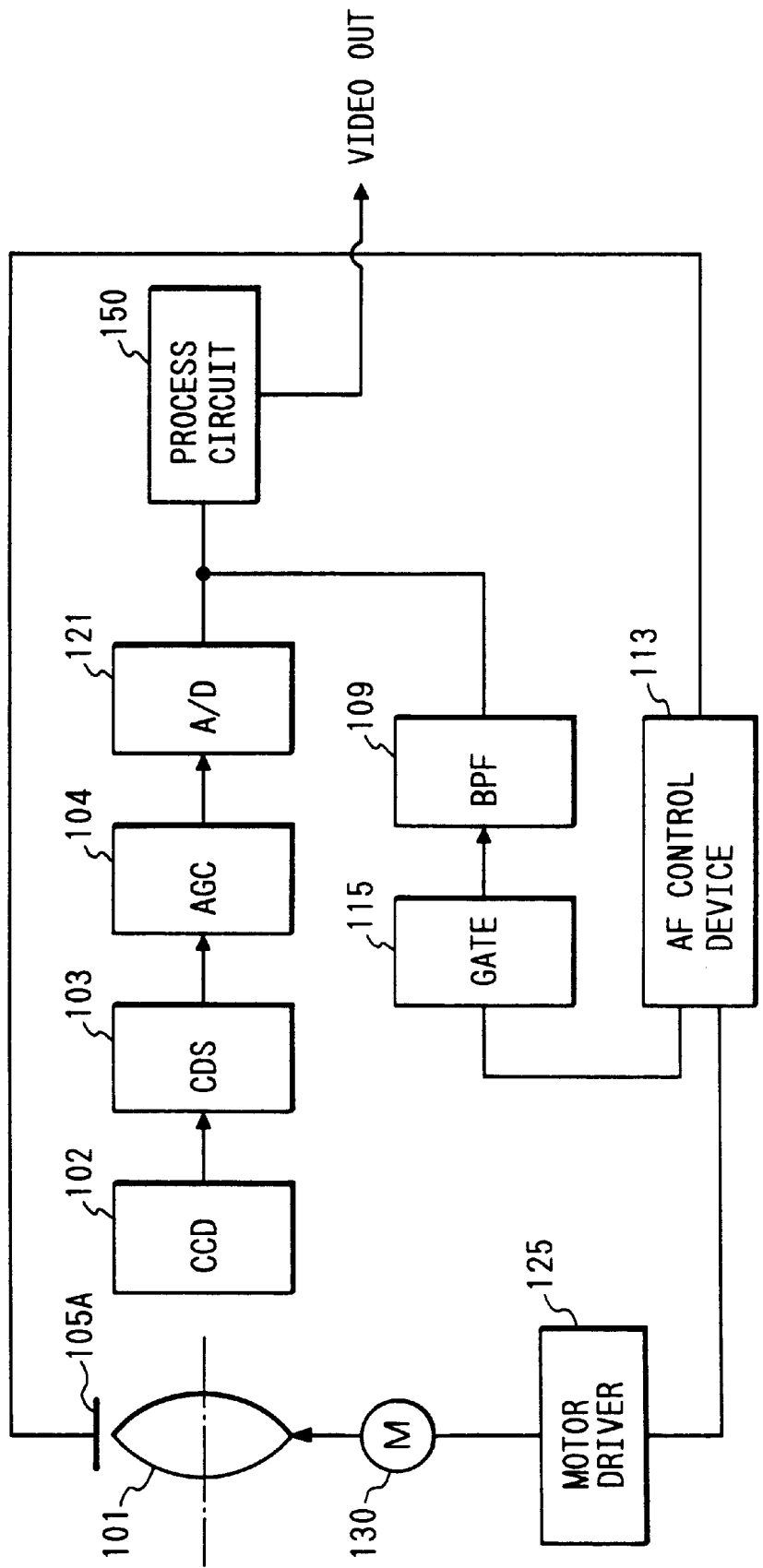
FIG. 13 is a block diagram showing the fourth embodiment of an AF apparatus according to the present invention.
Figure 14:
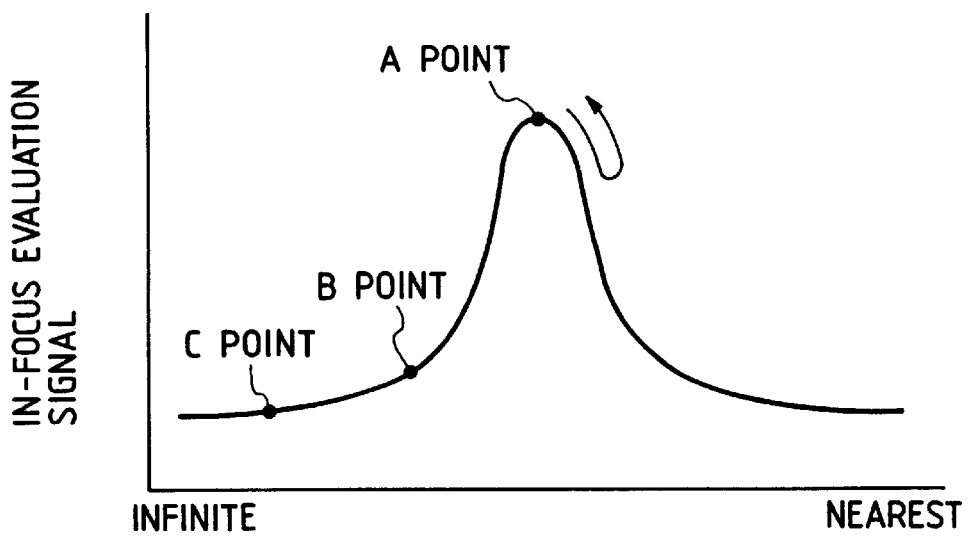
FIG. 14 is a graph for explaining an operation of the fourth embodiment of the AF apparatus according to the present invention.

The fifth embodiment will be described below with reference to FIGS. 13 and 14. FIG. 13 is a block diagram showing the arrangement of the fifth embodiment, and FIG. 14 is an explanatory view of the operation of the fifth embodiment.

Referring to FIG. 13, a focusing lens 101 is used for performing focusing in a photographing lens for performing focusing and zooming operations. An optical image of an object is formed by the focusing lens 101 on the image pickup surface of a CCD 102, and the optical image is photoelectrically converted by the CCD 102, thus obtaining a video signal of an object. The video signal is sampled and held by a CDS circuit 103 connected to the CCD 102, and is amplified by an AGC circuit 104 connected to the CDS circuit 103. The amplified video signal is A/D-converted by an A/D converter 121 connected to the AGC circuit 104. The A/D-converted video signal is subjected to matrix processing, gamma correction processing, and encoding processing by a process circuit 150, and the processed signal is supplied to a video recorder, an electronic view finder, and the like.

At the same time, the video signal A/D-converted by the A/D converter 121 is input to a BPF 109, and a focus signal is obtained by filtering a high-frequency component of the video signal. The focus signal is input to a gate circuit 115 connected to the-BPF 109. The gate circuit 115 performs gate processing for selecting a signal component in a focus detection region in a photographing field from the focus signal, and the gated focus signal is input to a microcomputer 113 as AF control means connected to the gate circuit 115.

The microcomputer 113 is connected to the output terminal of an encoder 105A for detecting the position of the focusing lens 101. The microcomputer 113 inputs a command signal to a motor driver 125 connected to the microcomputer 113 on the basis of the input focus signal with reference to a detection signal from the encoder 105A. The motor driver 125 drives a pulse motor 130 on the basis of the input command signal, and the focusing lens 101 is moved to an in-focus position by the pulse motor 130, thus attaining an in-focus operation.

In the fifth embodiment, in a hill-climbing AF control operation, when the focusing lens 101 is located at a position largely separated from an in-focus point A (in a considerably out-of-focus state), as indicated by a point C in FIG. 14, and when the focus signal changes little and direction discrimination cannot be precisely performed even upon a wobbling operation, the microcomputer 113 generates a command signal for driving the movable optical means in a direction determined by a standard object position where an object is present with a high probability, and the current position of the focusing lens 101. More specifically, when the difference between the focus signal obtained by driving the pulse motor 130 by a predetermined number of pulses in the infinite direction, and the focus signal obtained by driving the pulse motor 130 by the same predetermined number of pulses in the nearest direction is equal to or smaller than a predetermined value, if the focusing lens 101 is driven in the discriminated direction like in the prior art, the focusing lens 101 may be driven in a direction opposite to the in-focus direction. In this case, according to this embodiment, the current position of the focusing lens 101 is compared with the standard object position (object distance of 5 m to 10 m) where an object is present with a high probability so as to discriminate if the focusing lens is to be moved in the nearest or infinite direction, and the microcomputer 113 generates a command signal for driving the focusing lens 101 in the discriminated direction.

In this case, in the prior art, if the focusing lens 101 is located at the point C in FIG. 14, the focusing lens 101 is driven at high speed in the discriminated direction first of all. For this reason, if the driving direction is wrong, the focusing lens is kept driven until it abuts against the infinite or nearest end and is reversed, and the focus signal increases, thus requiring a long period of time until the focusing lens reaches an in-focus point. However, in the fifth embodiment, when a change in focus signal is very small even after the wobbling operation in such a considerably out-of-focus state, an in-focus operation is performed by discriminating the driving direction of the focusing lens 101 on the basis of the current position of the focusing lens 101 and the standard object position where an object is present with a high probability. For this reason, a wrong direction discrimination result will not be obtained even in a considerably out-of-focus state, and the in-focus operation can be performed within a short period of time.

According to the third embodiment, focus signals output from the BPFs and filtered by the plurality of frequency bands are selectively output and converted into absolute values by the absolute value circuit. The peak values of the focus signals output from the absolute value circuit are held in synchronism with the horizontal synchronization signal. The peak-hold focus signals are selectively input to the plurality of vertical peak hold circuits, and their peak values are sequentially held in the vertical direction. For this reason, focus signals are obtained by filtering in real time, and the focusing means moves the movable optical means to an in-focus position discriminated by the in-focus detection means, thus allowing high-precision in-focus control. In addition, since principal circuits can be commonly used for each frequency band, the circuit arrangement can be simplified and the manufacturing cost can be reduced.

According to the fourth embodiment, when the discrimination means discriminates a transition from the image recording standby state to the image recording state in the image recording standby state wherein the in-focus detection means discriminates an in-focus state, the control means redrives the in-focus operation by controlling the focusing means to shift the movable optical means from a position discriminated as an in-focus position. Therefore, the out-of-focus stop phenomenon can be automatically prevented, and the image recording operation can always be performed in a satisfactory focusing state.

According to the fifth embodiment, when the driving direction of the focusing lens cannot be detected on the basis of the focus signal, the control means operates to move the focusing lens in a direction determined by the position of the focusing lens and a predetermined standard object position. Therefore, a wrong direction discrimination result will not be obtained even in a considerably out-of-focus state, and the focusing lens can be controlled to reach an in-focus state within a short period of time and with a high probability.

What is claimed is:

1. An auto-focus integrated circuit, comprising:
    (A) filter means for extracting a plurality of frequency components including a difference between maximum and minimum values of luminance components of focus detection regions, which change in accordance with a focusing state, from an image pickup signal;
    (B) gate means for setting a plurality of predetermined focus detection regions in a photographing field;
    (C) arithmetic means for generating a plurality of evaluation signals of the focusing state, which have characteristics different from each other, by performing predetermined processings for the plurality of predetermined frequency components in the predetermined focus detection regions;
    (D) gate control means for controlling positions, sizes or the number of focus detection regions in the photographing filed by controlling said gate means according to an instruction from an external control circuit;
    (E) control means for controlling said filter means to extract different frequency components in the even and odd scanning lines respectively; and
    (F) interface means for connecting said integrated circuit to an external control circuit and for supplying to said external control circuit the plurality of evaluation signals output from said arithmetic means to perform an automatic focusing operation, wherein said integrated circuit includes at least a part of camera signal processing means for producing an image signal by performing a predetermined process on an output signal from an image sensor.

2. A circuit according to claim 1, wherein said filter means comprises a digital filter having a variable frequency characteristic.

3. A circuit according to claim 1, wherein said gate means can set a plurality of focus detection regions on the photographing field, and said gate control means can extract the output from said filter means in each of the plurality of focus detection regions by controlling said gate means.

4. A circuit according to claim 3, wherein said arithmetic means comprises a peak hold circuit for holding a peak value of the output from said filter means in each of the plurality of focus detection regions, and an integration circuit for integrating an output from said peak hold circuit in each of the plurality of focus detection regions.

5. A circuit according to claim 4, wherein said peak hold circuit and said integration circuit can independently obtain a peak value and an integration value in each of even and odd scanning lines in each of the plurality of focus detection regions.

6. A circuit according to claim 5, wherein said filter means has different frequency characteristics in the even and odd scanning lines.

7. A circuit according to claim 4, wherein said arithmetic circuit further comprises a luminance peak detection circuit for detecting a peak value of a luminance in each of the plurality of focus detection regions, and a luminance difference detection circuit for detecting a difference between maximum and minimum values of the luminance.

8. A circuit according to claim 7, wherein outputs from said peak hold circuit, said integration circuit, said luminance peak detection circuit, and said luminance difference detection circuit data-communicate with the external control circuit via said interface means.

9. A circuit according to claim 1, wherein the external control circuit comprises a microcomputer having a control interrupt control line.

10. An automatic focus control apparatus using a one-chip integrated circuit for focus control, comprising:
    (A) focusing means for performing focusing;
    (B) image pickup means;
    (C) an auto-focus integrated circuit for outputting a plurality of evaluation signals, which have characteristics different from each other and change in accordance with a focusing state, on the basis of an image pickup signal output from said image pickup means, said integrated circuit comprising
        a) gate means for setting a predetermined focus detection region in a photographing filed, and for allowing only the portion of the image pickup signal in the focus detection region to pass therethrough as a focus detection region signal,
        b) filter means for extracting a plurality of predetermined frequency components including a difference between maximum and minimum values of luminance components of the focus detection regions, which change in accordance with the focusing state, from the focus detection region signal,
        c) filter control means for controlling said filter means to extract different frequency components in the even and odd scanning lines respectively;
        d) arithmetic means for generating the plurality of evaluation signals by performing predetermined processing for the predetermined frequency components extracted by said filter means, and
        e) interface means for connecting said one-chip integrated circuit to control means and for supplying the plurality of evaluation signals generated by said arithmetic means to said control means; and
    (D) control means, connected to said integrated circuit via said interface means, for performing automatic focus control of said focusing means on the basis of the plurality of evaluation signals,
    wherein said one-chip integrated circuit includes at least part of camera signal processing means for producing a video signal by performing a predetermined process on the image pickup signal output from said image pickup means.

11. An apparatus according to claim 10, wherein said gate means can set a plurality of focus detection regions on the photographing field, and can extract the output from said filter means in each of the plurality of focus detection regions.

12. An apparatus according to claim 11, wherein said arithmetic means comprises a peak hold circuit for holding a peak value of the output from said filter means in each of the plurality of focus detection regions, and an integration circuit for integrating an output from said peak hold circuit in each of the plurality of focus detection regions.

13. An apparatus according to claim 12, wherein said peak hold circuit and said integration circuit can independently obtain a peak value and an integration value in each of even and odd scanning lines in each of the plurality of focus detection regions.

14. An apparatus according to claim 13, wherein said filter means has different frequency characteristics in the even and odd scanning lines.

15. An apparatus according to claim 13, wherein said arithmetic circuit further comprises a luminance peak detection circuit for detecting a peak value of a luminance in each of the plurality of focus detection regions, and a luminance difference detection circuit for detecting a difference between maximum and minimum values of the luminance.

16. An apparatus according to claim 15, wherein outputs from said peak hold circuit, said integration circuit, said luminance peak detection circuit, and said luminance difference detection circuit data-communicate with an externally connected control circuit via said interface means.

17. An apparatus according to claim 10, wherein said focusing means comprises a focusing lens and a focusing lens driving motor.

18. An automatic focus control apparatus comprising;
(A) extraction means for extracting a plurality of predetermined frequency components including a difference between maximum and minimum values of luminance components of focus detection regions, which change in accordance with a focusing state, from an image pickup signal corresponding to a portion in a plurality of predetermined focus detection regions set on a photographing field, said extracting means extracts different frequency components in the even and odd scanning lines respectively;
(B) peak detection means for detecting peak values of the frequency components in each horizontal scanning line within the portion in the focus detection regions;
(C) integration means for integrating an output from said peak detection means in the focus detection regions; and
(D) control means for controlling the focusing state on the basis of peak values output from said peak detection means in the focus detection regions, and an output from said integration means, said control means controlling a hill-climbing operation of a focusing lens, detection of an in-focus point of said focusing lens and restarting operation of said focusing lens.

19. An apparatus according to claim 18, wherein said control means hill-climbing-controls said focusing lens on the basis of the output from said integration means, performs detection of said in-focus point on the basis of the outputs from said peak detection means and said integration means, and performs restarting on the basis of the output from said peak detection means.

20. An apparatus according to claim 18, wherein a plurality of said focus detection regions are provided, and the outputs from said peak detection means and said integration means can be obtained in units of regions.

21. An apparatus according to claim 20, further comprising:
luminance peak detection means for detecting a peak value of a luminance in the image pickup signal; and
luminance difference detection means for detecting a difference between maximum and minimum values of the luminance.

22. An apparatus according to claim 21, wherein said control means performs detection of high and low luminance values and controls said plurality of focus detection regions on the basis of an output from said luminance peak detection means and/or an output from said luminance difference detection means.

23. An apparatus according to claim 22, wherein said control means performs focus detection using the focus detection regions other than the region from which the high and low luminance values are detected.

24. An automatic focusing apparatus comprising:
filter means for extracting different frequency components used in focus detection from an image pickup signal output from image pickup means in the even and odd scanning lines respectively;
gate means for extracting focus signals corresponding to focus detections regions in a photographing field from a focus signal extracted by said filter means;
extraction means for extracting a plurality of focus signals including a difference between maxiinum and minimum values of luminance components of the focus detection regions in the photographing field;
estimating means for estimating the extracted focus signals on the basis of outputs from said extraction means; and
driving means for driving a focusing lens to an in-focus point on the basis of the estimated extracted focus signals estimated by said estimating means.

25. An apparatus according to claim 24, wherein said extraction means holds peak values of the luminance components of the focus detection regions.

26. An auto-focus integrated circuit, comprising:
(A) filter means for extracting different frequency components including a difference between maximum and minimum values of luminance components of focus detection regions, which changes in accordance with a focusing state, from an image signal in the even and odd scanning lines respectively;
(B) gate means for extracting a predetermined signal component, corresponding to a portion in a predetermined focus detection region in a photographing filed, of the signal output from said filter means;
(C) arithmetic means for generating a plurality of evaluation signals, which have characteristics different from each other, by performing predetermined processing on the predetermined signal component extracted by said filter means; and
(D) interface means for connecting said integrated circuit to an external control circuit and for supplying to said external control circuit the evaluation signal output from said arithmetic means to perform an automatic focusing operation, wherein said integrated circuit includes at least a part of camera signal processing means for performing a predetermined process on an output signal from an image sensor.

27. A circuit according to claim 26, wherein said filter means comprises a digital filter having a variable frequency characteristic.

28. A circuit according to claim 26, further comprising gate control means for controlling a position and/or a size of the predetermined focus detection region in the photographing field.

29. A circuit according to claim 28, wherein said gate means can set a plurality of focus detection regions on the photographing field, and said gate control means can extract the output from said filter means in each of the plurality of focus detection regions by controlling said gate means.

30. A circuit according to claim 26, wherein said arithmetic means comprises a peak hold circuit for holding a peak value of the output from said filter means in each of the plurality of focus detection regions, and an integration circuit for integrating an output from said peak hold circuit in each of the plurality of focus detection regions.

31. A circuit according to claim 30, wherein said peak hold circuit and said integration circuit can independently obtain a peak value and an integration value in each of even and odd scanning lines in each of the plurality of focus detection regions.

32. A circuit according to claim 31, wherein said filter means has different frequency characteristics in the even and odd scanning lines.

33. A circuit according to claim 30, wherein said arithmetic circuit further comprises a luminance peak detection circuit for detecting a peak value of a luminance in each of the plurality of focus detection regions, and a luminance difference detection circuit for detecting a difference between maximum and minimum values of the luminance.

34. A circuit according to claim 33, wherein outputs from said peak hold circuit, said integration circuit, said luminance peak detection circuit, and said luminance difference detection circuit communicate date with the external control circuit via said interface means.

35. A circuit according to claim 26, wherein the external control circuit comprises a microcomputer having a control interrupt control line.

36. An auto-focus control integrated circuit chip for focus control, comprising:
 (a) extracting means for extracting different frequency components including a difference between maximum and minimum values of luminance components of focus detection regions, which changes in accordance with the focusing state, from an image signal corresponding to a focus detection region in the even and odd scanning lines respectively;
 (b) gate control means for operably controlling a size and/or a position of the focus detection region in a photographing field;
 (c) arithmetic means for generating a plurality of focus evaluation signals which have characteristics different from each other by performing predetermined processings, for the predetermined frequency components extracted by said extracting means;
 (d) interface means, arranged in said auto-focus control integrated circuit chip and connected to an external control circuit, for supplying the plurality of the focus evaluation signals generated by said arithmetic means to said external control circuit and for performing automatic focus control on the basis of the evaluation signals; and
 (e) camera signal processing means for performing a predetermined camera process on the image signal.

37. A circuit chip according to claim 36, wherein said gate control means can set a plurality of focus detection blocks in the focus detection region in the photographing field, and can extract the output from said extracting means in each of the plurality of focus detection blocks.

38. A circuit chip according to claim 37, wherein said arithmetic means comprises a peak hold circuit for holding a peak value of the output from said extracting means in each of the plurality of focus detection blocks, and an integration circuit for integrating an output from said peak hold circuit in each of the plurality of focus detection blocks.

39. A circuit chip according to claim 38, wherein said peak hold circuit and said integration circuit can independently obtain a peak value and an integration value in each of even and odd scanning lines in each of the plurality of focus detection blocks, and said filter means has different frequency characteristics in the even and odd scanning lines.

40. A circuit chip according to claim 39, wherein said arithmetic circuit further comprises a luminance peak detection circuit for detecting a peak value of a luminance in each of the plurality of focus detection regions, and a luminance difference detection circuit for detecting a difference between maximum and minimum values of the luminance.

41. A circuit chip according to claim 40, wherein outputs from said peak hold circuit, said integration circuit, said luminance peak detection circuit, and said luminance difference detection circuit communicate data with said external control means via said interface means.

42. An auto-focus integrated circuit comprising:
 (A) extracting means for extracting different frequency components including a difference between maximum and minimum values of luminance components of focus detection regions from an image signal in a focus detecting region set in an image frame in the even and odd scanning lines respectively;
 (B) region control means for operably controlling a size or a position of the focus detection region in response to an instruction from an external control circuit;
 (C) focus detecting means for detecting a focus state on the basis of the predetermined frequency components extracted by said extracting means and outputting a focus evaluating signal corresponding to the focus state;
 (D) processing means for performing at least a part of a camera processing operation on the image signal; and
 (E) interface means, connected to the external control circuit, for supplying the focus evaluating signals to said external control circuit to cause said external control circuit to perform a focusing operation.

43. A circuit according to claim 42, wherein said extracting means includes a digital filter having variable frequency characteristic.

44. A circuit according to claim 43, wherein the focus detection region comprises a plurality of detection blocks, and said region control means extracts the predetermined frequency component in each of the plurality of the detection blocks.

45. A circuit according to claim 43, wherein said focus detecting means comprises a peak hold circuit for holding a peak value of the output from said filter means in each of the plurality of focus detection regions, and an integration circuit for integrating an output from said peak hold circuit in each of the plurality of detection blocks, and said peak hold circuit and said integration circuit can independently obtain a peak value and an integration value in each of the even and odd scanning lines in each of the plurality of detection blocks.

46. A circuit according to claim 45, wherein said filter means has different frequency characteristics in the even and odd scanning lines.

47. A circuit according to claim 42, wherein said interface means communicate data with said external control circuit to supply the focus evaluating signal.

48. A circuit according to claim 42, wherein the external control circuit comprises a microcomputer having a control interrupt control line.

* * * * *

UNITED STATES PATENT AND TRADEMARK OFFICE
CERTIFICATE OF CORRECTION

PATENT NO. : 6,271,883 B1  
DATED : August 7, 2001  
INVENTOR(S) : Iijima et al.

Page 1 of 1

It is certified that error appears in the above-identified patent and that said Letters Patent is hereby corrected as shown below:

Column 1,  
Line 61, delete "AP" and please insert therefor -- AF --

Column 3,  
Line 5, delete "AP" and insert therefor -- AF --

Column 4,  
Line 64, delete "FIG. 2" and insert therefor -- FIG. 1 --

Column 6,  
Line 15, delete "S1" and insert therefor -- S11 --

Column 19,  
Line 60, delete "the-BPF" and insert therefor -- the BPF --

Column 21,  
Line 40, delete "filed" and insert therefor -- field --

Column 22,  
Line 33, delete "filed" and insert therefor -- field --

Column 24,  
Line 23, delete "maxiinum" and insert therefor -- maximum --  
Line 44, delete "filed" and insert therefor -- field --

Signed and Sealed this

Thirtieth Day of April, 2002

*Attest:*

*Attesting Officer*

JAMES E. ROGAN  
*Director of the United States Patent and Trademark Office*